United States Patent
Taylor et al.

(10) Patent No.: US 10,671,501 B2
(45) Date of Patent: Jun. 2, 2020

(54) SYSTEMS AND METHODS FOR SEQUENTIAL RESILVERING

(71) Applicant: Oracle International Corporation, Redwood Shores, CA (US)

(72) Inventors: Eric Carl Taylor, Superior, CO (US); Zhu Xiao, Acton, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 15/610,140

(22) Filed: May 31, 2017

(65) Prior Publication Data

US 2017/0329682 A1    Nov. 16, 2017

Related U.S. Application Data

(63) Continuation of application No. 15/407,979, filed on Jan. 17, 2017, which is a continuation-in-part of application No. 14/477,645, filed on Sep. 4, 2014, now Pat. No. 9,594,635.

(60) Provisional application No. 62/009,825, filed on Jun. 9, 2014.

(51) Int. Cl.
| | |
|---|---|
| *G06F 11/00* | (2006.01) |
| *G06F 11/20* | (2006.01) |
| *G06F 11/10* | (2006.01) |
| *G06F 11/14* | (2006.01) |

(52) U.S. Cl.
CPC ...... *G06F 11/2082* (2013.01); *G06F 11/1092* (2013.01); *G06F 11/14* (2013.01); *G06F 11/2069* (2013.01); *G06F 11/2071* (2013.01); *G06F 2201/805* (2013.01); *G06F 2201/82* (2013.01)

(58) Field of Classification Search
CPC ............ G06F 11/2082; G06F 11/1092; G06F 11/2071; G06F 11/2069; G06F 2201/82; G06F 2201/805
USPC ........................................................ 714/38.1
See application file for complete search history.

(56) References Cited

U.S. PATENT DOCUMENTS

| | | |
|---|---|---|
| 5,448,718 A | 9/1995 | Cohn et al. |
| 5,497,483 A | 3/1996 | Beardsley et al. |
| 5,517,632 A | 5/1996 | Matsumoto et al. |

(Continued)

OTHER PUBLICATIONS

U.S. Appl. No. 14/477,645, Non-Final Office Action dated Mar. 31, 2016, 12 pages.

(Continued)

*Primary Examiner* — Yair Leibovich
(74) *Attorney, Agent, or Firm* — Kilpatrick Townsend Stockton LLP

(57) ABSTRACT

A method of reconstructing data from a failed storage device in a storage pool includes identifying a plurality of data blocks that are stored on the failed storage device, and sorting the plurality of data blocks in an order in which the plurality of data blocks are located on the failed storage device. Each of the plurality of data blocks may be associated with an I/O operation. The method may also include grouping the I/O operations for the plurality of data blocks into sequential I/O operations based on the order in which the plurality of data blocks are located on the failed storage device, and executing the sequential I/O operations to resilver a new storage device replacing the failed storage device.

16 Claims, 13 Drawing Sheets

(56) References Cited

U.S. PATENT DOCUMENTS

| | | | |
|---|---|---|---|
| 5,675,767 A | 10/1997 | Baird et al. | |
| 6,081,774 A | 6/2000 | De Hita et al. | |
| 6,173,415 B1* | 1/2001 | Litwin | G06F 11/1076 711/114 |
| 6,208,999 B1 | 3/2001 | Spilo et al. | |
| 6,385,706 B1* | 5/2002 | Ofek | G06F 11/1464 707/999.202 |
| 7,111,086 B1* | 9/2006 | Ecoleston | G06F 13/362 709/232 |
| 8,856,202 B2* | 10/2014 | McCabe | G06F 3/0626 709/200 |
| 8,954,670 B1* | 2/2015 | Subramanian | G06F 11/2056 711/113 |
| 9,594,635 B2 | 3/2017 | Taylor et al. | |
| 2005/0283754 A1 | 12/2005 | Vignet | |
| 2007/0088904 A1* | 4/2007 | Sinclair | G06F 3/0679 711/103 |
| 2007/0106677 A1 | 5/2007 | Moore et al. | |
| 2007/0168569 A1* | 7/2007 | Bonwick | G06F 3/0611 710/5 |
| 2009/0106255 A1 | 4/2009 | Lacapra et al. | |
| 2009/0113145 A1* | 4/2009 | Slater | G06F 11/1451 711/154 |
| 2010/0251012 A1 | 9/2010 | Zwisler et al. | |
| 2013/0055018 A1* | 2/2013 | Joshi | G06F 11/2058 714/19 |
| 2014/0059552 A1 | 2/2014 | Cunningham et al. | |
| 2014/0201565 A1 | 7/2014 | Candea et al. | |
| 2014/0365819 A1 | 12/2014 | Cooper et al. | |
| 2015/0355968 A1 | 12/2015 | Taylor et al. | |
| 2016/0173881 A1 | 6/2016 | Alshina et al. | |
| 2017/0192864 A1 | 7/2017 | Taylor et al. | |

OTHER PUBLICATIONS

U.S. Appl. No. 14/477,645, Notice of Allowance dated Nov. 4, 2016, 10 pages.

Degraded Mode, Wikipedia, Available Online at https://web.archive.org/web/20130814132618/https://en.wikipedia.org/wiki/Degraded_mode, Aug. 14, 2013, 1 page.

U.S. Appl. No. 15/407,979, Non-Final Office Action dated Jan. 11, 2019, 9 pages.

U.S. Appl. No. 15/407,979, Non-Final Office Action dated Jul. 25, 2019, 10 pages.

* cited by examiner

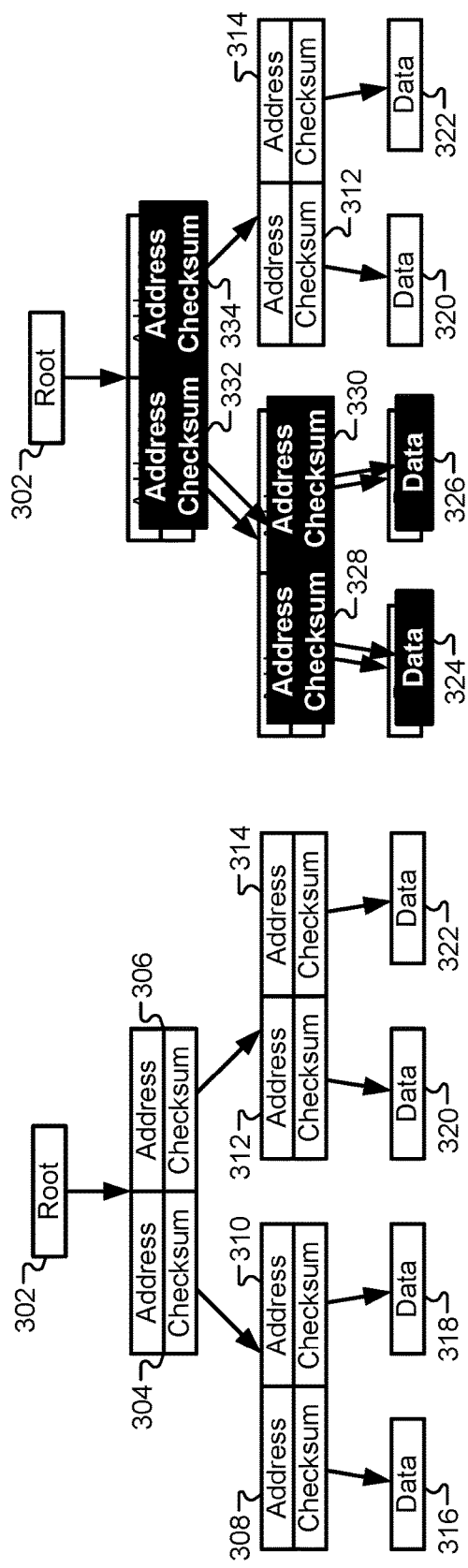
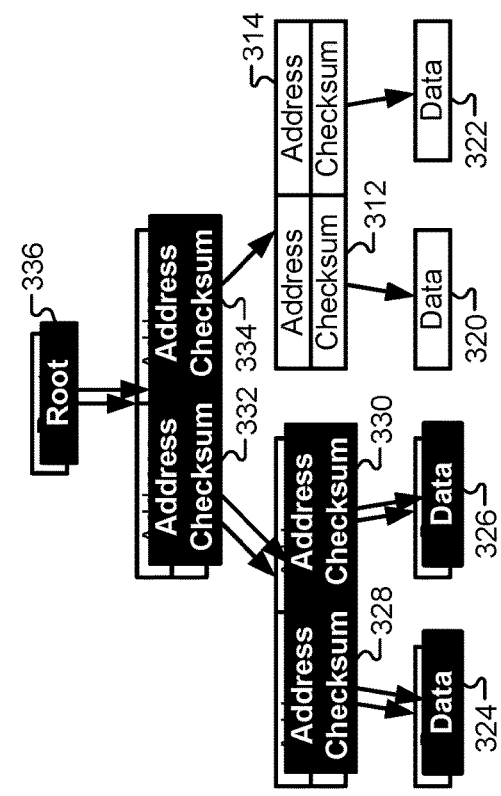
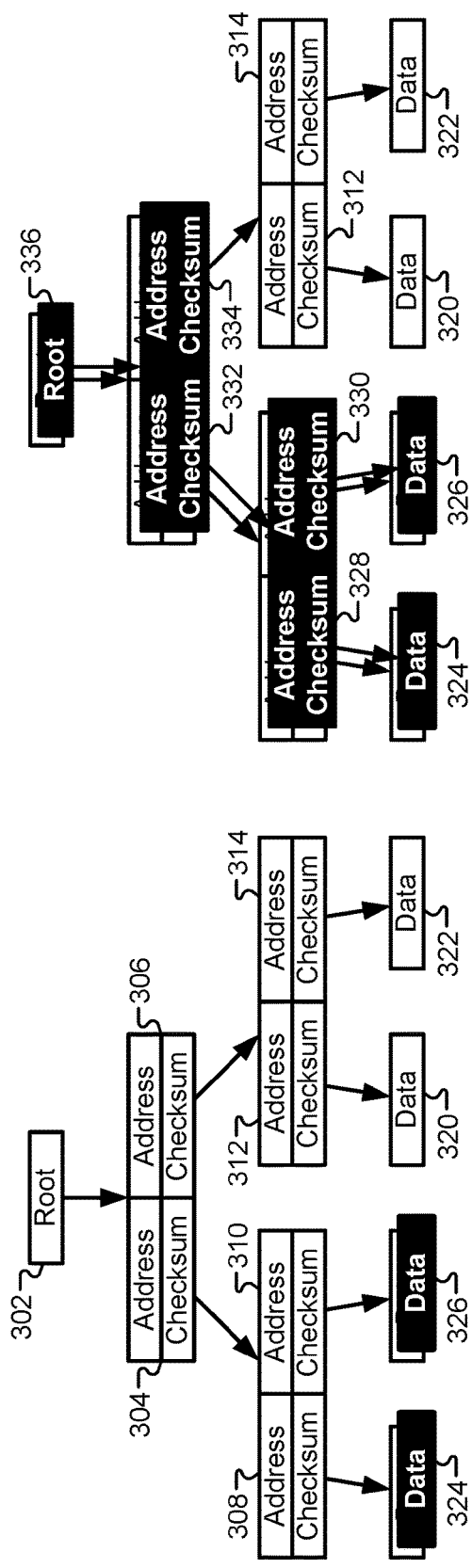
FIG. 3A  FIG. 3B  FIG. 3C  FIG. 3D

SYSTEMS AND METHODS FOR SEQUENTIAL RESILVERING

CROSS-REFERENCES TO RELATED APPLICATIONS

This application is a continuation U.S. patent application Ser. No. 15/407,979 entitled "Sequential Resilvering of Storage Devices with Reduced Restarts" and filed on Jan. 17, 2017, which is hereby incorporated by reference in its entirety for all purposes.

U.S. patent application Ser. No. 15/407,979 is a continuation-in-part of U.S. patent application Ser. No. 14/477,645, entitled "Systems and Methods for Sequential Resilvering" and filed on Sep. 4, 2014, which is hereby incorporated by reference in its entirety for all purposes.

U.S. patent application Ser. No. 14/477,645 claims the benefit of U.S. Provisional Patent Application No. 62/009,825, entitled "Systems and Methods for Sequential Resilvering" and filed on Jun. 9, 2014, which is hereby incorporated by reference in its entirety for all purposes.

BACKGROUND

The continuous expansion of the Internet, along with the expansion and sophistication of computing networks and systems, has led to the proliferation of content being stored and accessible over the Internet. This in turn has driven the need for large and sophisticated data storage systems. As the demand for data storage continues to increase, larger and more sophisticated storage systems are being designed and deployed. Many large scale data storage systems utilize storage appliances that include arrays of physical storage media. These storage appliances are capable of storing incredible amounts of data. For example, at this time, Oracle's SUN ZFS Storage ZS5-4 appliance can store up to 6.9 petabytes of data. Moreover, multiple storage appliances may be networked together to form a storage pool, which can further increase the volume of stored data.

Typically, large storage systems such as these may include a file system for storing and accessing files. In addition to storing system files (operating system files, device driver files, etc.), the file system provides storage and access of user data files. If any of these files (system files and/or user files) contain critical data, then it becomes advantageous to employ a data backup scheme to ensure that critical data is not lost if a file storage device fails. One data backup scheme that is commonly employed is mirroring. Mirroring involves maintaining two or more copies of a file, where each copy of the file is located on a separate file storage device (e.g., a local hard disk, a networked hard disk, a network file server, etc.). For example, storage appliances arranged in a cluster may be configured to mirror data so that if one of the storage appliances becomes inoperable, the data is available at another storage location.

When one or more file storage devices fails for any length of time, the file storage device(s) may become unsynchronized. However, when employing a mirroring scheme, the mirrors should be synchronized (i.e., the contents of each mirror are the same) to ensure critical data is backed up. If a mirror becomes unsynchronized the simplest recovery scheme involves copying all of the data from a synchronized mirror to the unsynchronized mirror. However, copying all data from one file storage device to another file storage device may take a considerable amount of time and may reduce performance of the collective file storage devices significantly during the resynchronization process.

BRIEF SUMMARY

In some embodiments, a method of resilvering a plurality of failed devices in a storage pool may include detecting a failure of a first storage device in the storage pool, and determining a plurality of data blocks that are stored on the first storage device. The method may also include sorting the plurality of data blocks into one or more buckets in an order in which the plurality of data blocks are located on the first storage device, and detecting a failure of a second storage device in the storage pool after detecting the failure of the first storage device. The method may further include determining that one or more of the plurality of data blocks are also located on the second storage device, and reusing at least part of the one or more buckets to resilver the second storage device.

In some embodiments, a non-transitory, computer-readable medium may include instructions that, when executed by one or more processors, cause the one or more processors to perform operations including detecting a failure of a first storage device in the storage pool, and determining a plurality of data blocks that are stored on the first storage device. The operations may also include sorting the plurality of data blocks into one or more buckets in an order in which the plurality of data blocks are located on the first storage device, and detecting a failure of a second storage device in the storage pool after detecting the failure of the first storage device. The operations may additionally include determining that one or more of the plurality of data blocks are also located on the second storage device, and reusing at least part of the one or more buckets to resilver the second storage device.

In some embodiments, a system may include one or more processors and one or more memory devices that include instructions that, when executed by the one or more processors, cause the one or more processors to perform operations including detecting a failure of a first storage device in the storage pool, and determining a plurality of data blocks that are stored on the first storage device. The operations may also include sorting the plurality of data blocks into one or more buckets in an order in which the plurality of data blocks are located on the first storage device, and detecting a failure of a second storage device in the storage pool after detecting the failure of the first storage device. The operations may further include determining that one or more of the plurality of data blocks are also located on the second storage device, and reusing at least part of the one or more buckets to resilver the second storage device.

In any embodiment, one or more of the following features may be included in any combination and without limitation. The storage pool may include a Redundant Array of Independent Disks (RAID). Determining the plurality of data blocks that are stored on the first storage device may include traversing a file system to discover a physical location of each leaf node. Sorting the plurality of data blocks into one or more buckets may include performing a first sorting operation that coarsely sorts data blocks into each of the one or more buckets based on disk address, such that blocks within each of the one or more buckets are not required to be in disk address order. Sorting the plurality of data blocks into one or more buckets may include performing a second sorting operation that sorts the blocks within each of the one or more buckets according to disk address order. The blocks within each of the one or more buckets may be sorted into Adelson-Velsky Landis (AVL) tree. Buckets in the one or more buckets that are not used to resilver the second storage device may be deleted prior to resilvering the second storage device. The operations may also include determining that each block in a bucket in the one or more buckets is also located on the second storage device; determining that each block in the bucket is in the same order on the first storage device as on the second storage device; and reusing the bucket to resilver the second storage device without requiring the bucket to be resorted. The operations may also include determining that each block in a bucket in the one or more buckets is also located on the second storage device; determining that blocks in the bucket are in a different order on the first storage device than on the second storage device; using the bucket to resilver the first storage device without requiring the bucket to be resorted; sorting, after resilvering the first storage device, the blocks in the bucket to be in order according to the second storage device; and using the bucket to resilver the second storage device. The operations may additionally include determining that at least one block in a bucket in the one or more buckets is also located on the second storage device; determining that at least one block in the bucket is not located on the second storage device; and removing, after resilvering the first storage device, the at least one block in the bucket that is not located on the second storage device. The operations may additionally include determining that a first block in a bucket in the one or more buckets is also located on the second storage device; determining that a second block that should be sorted into the bucket from the second device is not in the bucket; and adding the second block to the bucket after resilvering the first storage device. The operations may further include determining that no blocks in a bucket in the one or more buckets are also located on the second storage device; deleting the blocks in the bucket after resilvering the first storage device; and sorting new blocks from the second storage device into the bucket.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 3A illustrates a step in a COW process for a file system, according to some embodiments.

FIG. 3B illustrates a step in a COW process for a file system, according to some embodiments.

FIG. 3C illustrates a step in a COW process for a file system, according to some embodiments.

FIG. 3D illustrates a step in a COW process for a file system, according to some embodiments.

DETAILED DESCRIPTION

Figure 1:
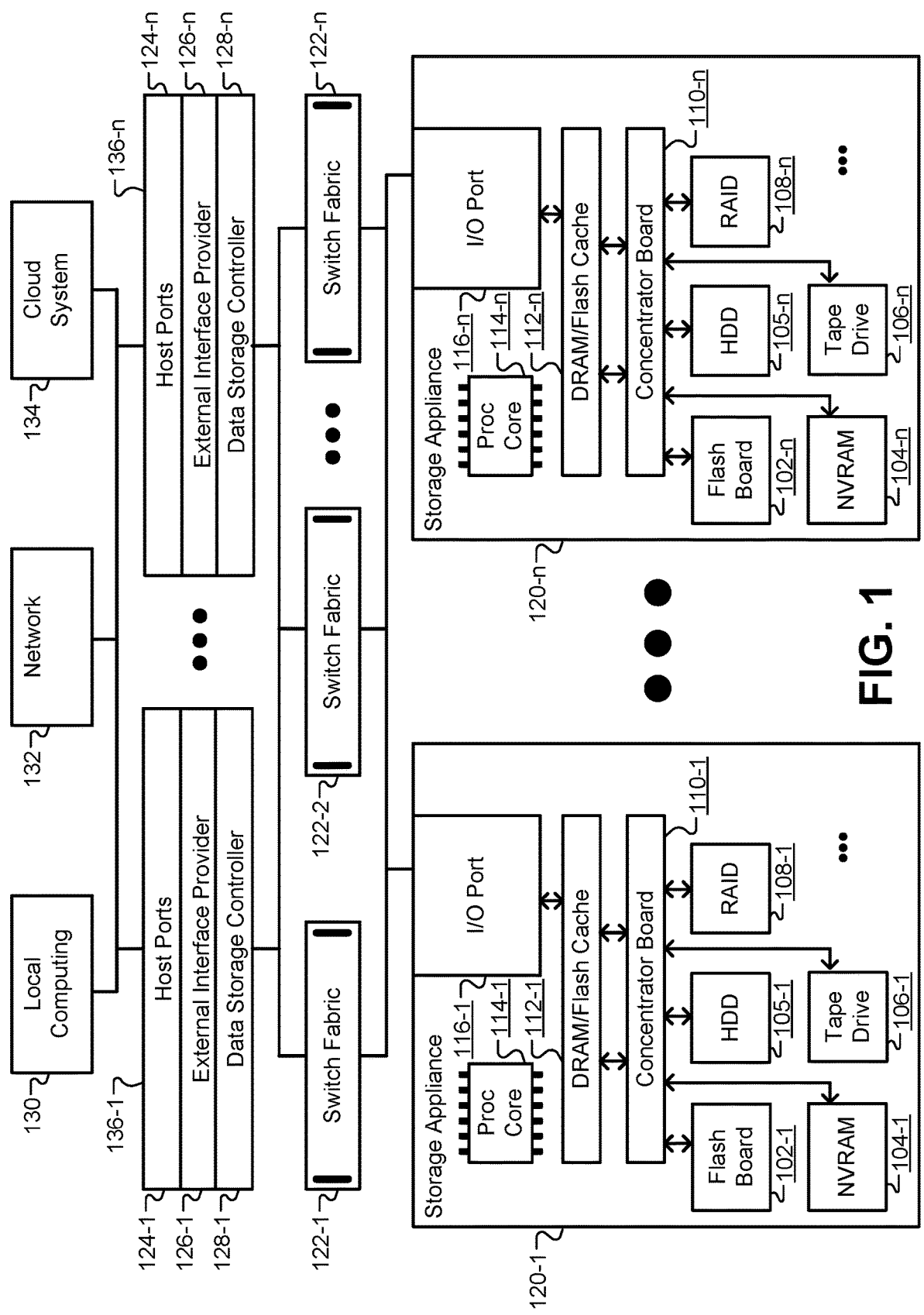
FIG. 1 illustrates one example storage network.

The embodiments disclosed herein relate to technology for the sequential rebuilding of storage devices in a way that reduces restarts during the rebuilding process. When a device in a storage pool fails, the data from the failed device needs to be rebuilt on a spare disk as quickly as possible. The process for transferring data to a new storage device is referred to as "resilvering." A resilver process to reconstruct the data corresponding to the failed disk may be performed by traversing the data through the file system in logical order to discover memory blocks located on the unsynchronized or damaged storage device. File systems utilizing a copy-on-write transactional object model, such as Oracle's ZFS file system, generally discover and reconstruct the data according to when the block was written. Conventional resilvering generally involves traversing metadata to discover a damaged/unsynchronized memory block and issuing a repair I/O instruction to read a copy of the damaged memory block to the new storage device, then traversing the next metadata path, and so on. As such, file systems using copy-on-write, for example, may experience small random I/O's to the drive during conventional resilvering, which dramatically increases the resilvering time.

Accordingly, in some embodiments, each block may be described by a block ID (i.e. the number of the block within a file or object) and may be discovered by traversing the file system. The block ID can then be mapped to a Data Virtual Address (DVA), which maps to a specific location on the failed disk. Instead of copying data blocks according to their block ID or location in the file system, the data blocks can be sorted according to their physical location on the disk, which results in larger, sequential I/O instructions that can significantly reduce resilvering times by up to 75%. In some embodiments, resilvering can be performed in two phases. During the first phase, an array of buckets may be created. The number of buckets in the array may be based on an amount of memory being reconstructed from the damaged storage device. The file system can be traversed in sequential order to identify all of the data blocks located on the damaged device. These data blocks can be sorted into buckets based on their physical location on the damaged storage device. During the second phase, each of the buckets can be sorted in sequential order according to physical location. For example, each bucket can be organized into a sorted tree (e.g., an Adelson Velskii Landis (AVL) tree) by block location. The AVL tree may embody a partially-balanced binary tree. The sorted blocks in a bucket can then be sequentially written to the replacement storage device. Because the sorted blocks are in order according to their location on the damaged storage device rather than by logical order according to file system traversal, individual I/O commands for writing each block can be combined into sequential I/O commands. By combining these I/O commands, the resilver time can be greatly reduced.

Although the resilver time is dramatically decreased using the sequential process described above, when an additional storage device in the storage pool fails, existing systems restart the resilvering process from the beginning, thereby resulting in repeated work, increased resilvering time, and a continued burden on resources of the storage pool. In some embodiments, when the additional failed storage device is under the same top-level as the first failed storage device, the list of blocks to resilver for to the additional failed storage device may overlap with the list of blocks to resilver for to the first failed storage device. As such, the information from the first phase of the sequential resilvering process described above may be reused instead of starting over. If the additional storage device fails during the first phase, the first phase may continue from where it left off when the additional storage device failed until the first phase is completed. If the additional storage device fails during the second phase, the resilvering of the second storage device may continue from the end of the first phase. By leveraging the block discovery of the first phase, the total resilvering time for recovering from a multi-disk failure can be significantly reduced.

The embodiments described herein may be broadly applicable to any software file system and to any physical storage network. FIG. 1 illustrates one example storage network that may be used to implement any of the embodiments described herein. However, the selection and/or arrangement of hardware devices depicted in FIG. 1 is shown only by way of example, and is not meant to be limiting. FIG. 1 provides a plurality of storage appliances 120 connected through one or more switch circuits 122. The switch circuits 122 connect the plurality of storage appliances 122 to a plurality of I/O servers 136, which in turn provide access to the plurality of storage appliances 122 for client devices, such as local computer systems 130, computer systems available over a network 132, and/or cloud computing systems 134.

Each I/O server 136 may execute multiple independent file system instances, each of which may be responsible for the management of a portion of the overall storage capacity. As will be described in greater detail below, these file system instances may include the Oracle ZFS file system. The I/O servers 136 may comprise blade and/or standalone servers that include host ports 124 to communicate with the client devices by receiving read and/or write data access requests. The host ports 124 may communicate with an external interface provider 126 that identifies a correct data storage controller 128 to service each I/O request. The data storage controllers 128 can each exclusively manage a portion of data content in one or more of the storage appliances 120 described below. Thus, each data storage controller 128 can access a logical portion of the storage pool and satisfy data requests received from the external interface providers 126 by accessing their own data content. Redirection through the data storage controllers 128 may include redirection of each I/O request from the host ports 124 to a file system instance (e.g., a ZFS instance) executing on the I/O servers 136 and responsible for the blocks requested. For example, this may include a redirection from a host port 124-1 on one I/O server 136-1 to a ZFS instance on another I/O server 136-n. This redirection may allow any part of the available storage capacity to be reached from any host port 124. The ZFS instance may then issue the necessary direct I/O transactions to any storage device in the storage pool to complete the request. Acknowledgements and/or data may then be forwarded back to the client device through the originating host port 124.

A low-latency, memory-mapped network may tie together the host ports 124, any file system instances, and the storage appliances 120. This network may be implemented using one or more switch circuits 122, such as Oracle's Sun Data Center InfiniBand Switch 36 to provide a scalable, high-performance cluster. A bus protocol, such as the PCI Express bus, may route signals within the storage network. The I/O servers 136 and storage appliances 120 may communicate as peers. The redirection traffic and ZFS memory traffic may both use the same switch fabric.

Many different configurations of the storage appliances 120 may be used in the network of FIG. 1. In some embodiments, the Oracle ZFS Storage Appliance series may be used. The ZFS Storage Appliance provides storage based on the Oracle Solaris kernel with Oracle's ZFS file system described below. The processing core 114 handles any operations required to implement any selected data protection (e.g., mirroring, RAID-Z, etc.), data reduction (e.g., inline compression, duplication, etc.), and any other implemented data services (e.g., remote replication, etc.). In one embodiment, the processing core may comprise an 8×15 core of 2.8 GHz Intel® Xeon® processors. The processing core also handles the caching of stored data in both DRAM and Flash 112. In one embodiment, the DRAM/Flash cache may comprise a 3 TB DRAM cache.

In some configurations, the storage appliances 120 may comprise an I/O port 116 to receive I/O requests from the data storage controllers 128. Each of the storage appliances 120 may include an integral rack-mounted unit with its own internally redundant power supply and cooling system. A concentrator board 110 or other similar hardware device may be used to interconnect a plurality of storage devices. Active components such as memory boards, concentrator boards 110, power supplies, and cooling devices may be hot swappable. For example, the storage appliance 120 may include flash memory 102, nonvolatile RAM (NVRAM) 104, various configurations of hard disk drives 105, tape drives, RAID arrays 108 of disk drives, and so forth. These storage units may be designed for high availability with hot swapping and internal redundancy of memory cards, power, cooling, and interconnect. In some embodiments the RAM may be made non-volatile by backing it up to dedicated Flash on loss of power. The mix of Flash and NVRAM cards may be configurable, and both may use the same connector and board profile.

Although not shown explicitly, each of the I/O servers 136 may execute a global management process, or data storage system manager, that may supervise the operation of the storage system in a pseudo-static, "low touch" approach, intervening when capacity must be reallocated between ZFS instances, for global Flash wear leveling, for configuration changes, and/or for failure recovery. The "divide and conquer" strategy of dividing the capacity among individual ZFS instances may enable a high degree of scalability of performance, connectivity, and capacity. Additional performance may be achieved by horizontally adding more I/O servers 136, and then assigning less capacity per ZFS instance and/or fewer ZFS instances per I/O server 136. Performance may also be scaled vertically by using faster servers. Additional host ports may be added by filling available slots in the I/O servers 136 and then adding additional servers. Additional capacity may also be achieved by adding additional storage appliances 120, and allocating the new capacity to new or existing ZFS instances.

Figure 2:
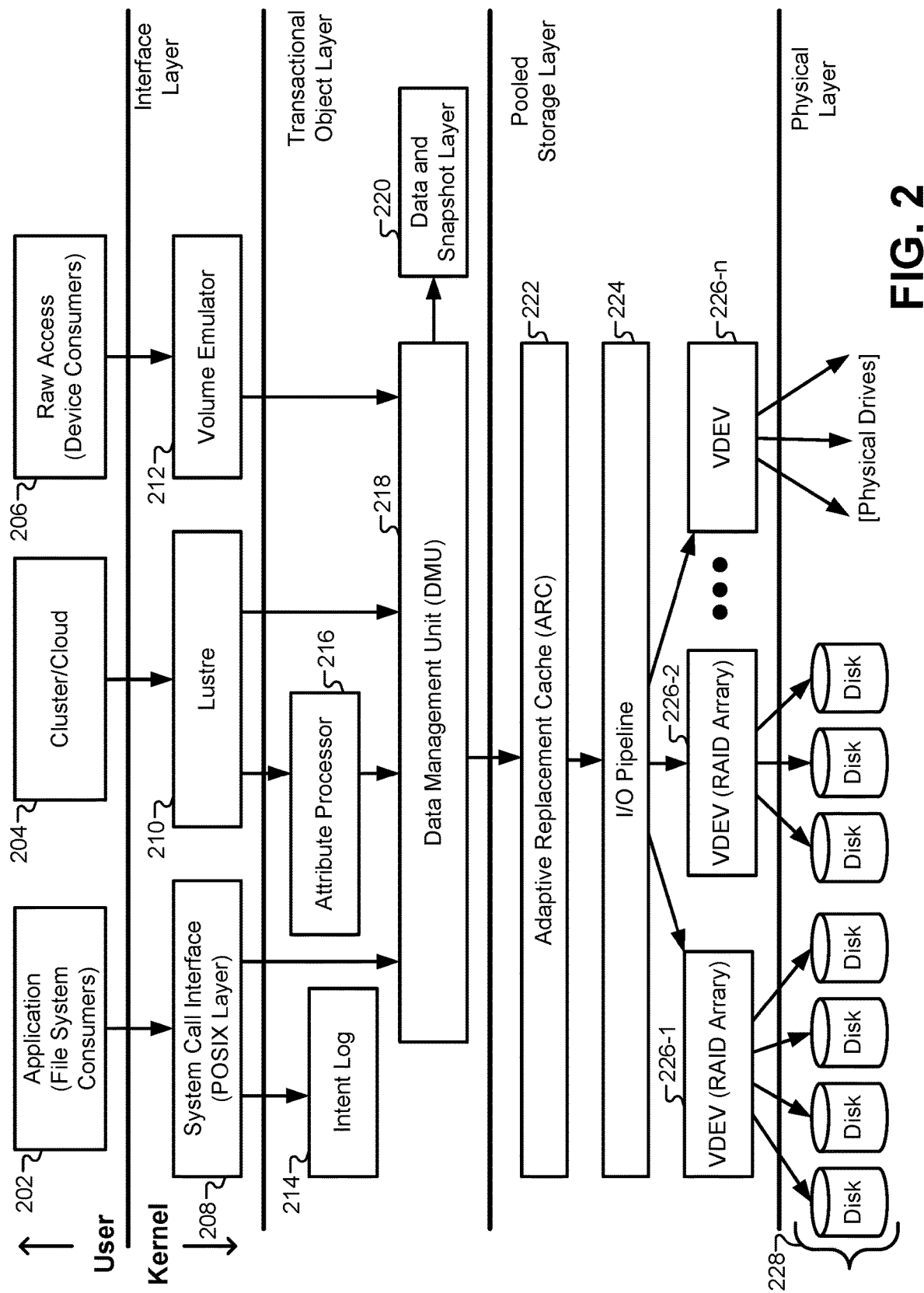
FIG. 2 illustrates an instance of an example network file system that may be executed in the a storage environment.

FIG. 2 illustrates an instance of an example network file system that may be executed in the any storage environment, including the storage environment of FIG. 1. For example, the file system may comprise the Oracle ZFS file system, which provides very large capacity (128-bit), data integrity, an always-consistent, on-disk format, self-optimizing performance, and real-time remote replication. ZFS departs from traditional file systems by eliminating the need for a separate volume manager. Instead, a ZFS file system shares a common storage pool of storage devices and acts as both the volume manager and the file system. Therefore, ZFS has complete knowledge of both the physical disks and volumes (including their condition, status, and logical arrangement into volumes, along with all the files stored on them). Devices can be added or removed from the pool as file system capacity requirements change over time to dynamically grow and shrink as needed without needing to repartition the underlying storage pool.

In one implementation, the system may interact with an application 202 through an operating system. The operating system may include functionality to interact with a file system, which in turn interfaces with a storage pool. The operating system typically interfaces with the file system via a system call interface 208. The system call interface 208 provides traditional file read, write, open, close, etc., operations, as well as VNODE operations and VFS operations that are specific to the VFS architecture. The system call interface 208 acts as a primary interface for interacting with the ZFS as a file system. This layer resides between a data management unit (DMU) 218 and presents a file system abstraction of the files and directories stored therein. The system call interface 208 may be responsible for bridging the gap between the file system interfaces and the underlying DMU 218 interfaces.

In addition to the POSIX layer of the system call interface 208, the interface layer of the file system may also provide a distributed file system interface 210 for interacting with cluster/cloud computing devices 204. For example, a Lustre® interface may be provided to provide a file system for computer clusters ranging in size from small workgroup clusters to large-scale, multi-site clusters. A volume emulator 212 may also provide a mechanism for creating logical volumes which can be used as block/character devices. The volume emulator 212 not only allows a client system to distinguish between blocks and characters, but also allows the client system to specify the desired block size and thereby create smaller, sparse volumes in a process known as "thin provisioning." The volume emulator 212 provides raw access 206 to external devices.

Underneath the interface layer lies a transactional object layer. This layer provides an intent log 214 configured to record a per-dataset transactional history which can be replayed upon a system crash. In ZFS, the intent log 214 saves transaction records of system calls that change the file system in memory with enough information to be able to replay the system calls. These are stored in memory until the DMU 218 commits them to the storage pool and they can be discarded or they are flushed. In the event of a power failure and/or disk failure, the intent log 214 transactions can be replayed to keep the storage pool up-to-date and consistent.

The transactional object layer also provides an attribute processor 216 that is commonly used to implement directories within the POSIX layer of the system call interface 208 by making arbitrary {key, value} associations within an object. The attribute processor 216 comprises a module that sits on top of the DMU 218 and operates on objects referred to in the ZFS as "ZAP objects." ZAP objects are used to store properties for a dataset, navigate file system objects, and/or store storage pool properties. ZAP objects may come in two forms: "microzap" objects and "fatzap" objects. Microzap objects are a lightweight version of the fatzap objects and provide a simple and fast lookup mechanism for a small number of attribute entries. Fatzap objects are better suited for ZAP objects containing large numbers of attributes, such as larger directories, longer keys, longer values, etc.

The transactional object layer also provides a data set and snapshot layer 220 that aggregates DMU objects in a hierarchical namespace, and provides a mechanism for describing and managing relationships between properties of object sets. This allows for the inheritance of properties, as well as quota and reservation enforcement in the storage pool. DMU objects may include ZFS file system objects, clone objects, CFS volume objects, and snapshot objects. The data and snapshot layer 220 can therefore manage snapshot and clone object sets. A snapshot is a read-only version of a file system, clone, or volume at a particular point in time. Clones originate from snapshots and their initial contents are identical to that of the snapshot from which they originated. Clones are identical to the file system with the exception of its origin. In ZFS, snapshots persist across system reboots and do not need to use a separate storage pool. Instead, snapshots consume disk space directly from the same storage pool as the file system or volume from which they were created. Snapshots can be recursively created quickly as one atomic expression. Snapshots can be cloned, backed up, rolled back to, and so forth. Typically, snapshots provide a fast and efficient way to backup the current stable file system before risky actions, such as a software installation or system upgrade, are performed.

The DMU 218 presents a transactional object model built on top of a flat address space presented by the storage pool. The modules described above interact with the DMU 218 via object sets, objects, and transactions, where objects are pieces of storage from the storage pool, such as a collection of data blocks. Each transaction through the DMU 218 comprises a series of operations that are committed to the storage pool as a group. This is the mechanism whereby on-disk consistency is maintained within the file system. Stated another way, the DMU 218 takes instructions from the interface layer and translates those into transaction batches. Rather than requesting data blocks and sending single read/write requests, the DMU 218 can combine these into batches of object-based transactions that can be optimized before any disk activity occurs. Once this is done, the batches of transactions are handed off to the storage pool layer to schedule and aggregate the raw I/O transactions required to retrieve/write the requested data blocks. As will be described below, these transactions are written on a copy-on-write (COW) basis, which eliminates the need for transaction journaling.

The storage pool layer, or simply the "storage pool," may be referred to as a storage pool allocator (SPA). The SPA provides public interfaces to manipulate storage pool configuration. These interfaces can create, destroy, import, export, and pool various storage media and manage the namespace of the storage pool. In some embodiments, the SPA may include an adaptive replacement cache (ARC) 222 that acts as a central point for memory management for the SPA. Traditionally, an ARC provides a basic least-recently-used (LRU) page replacement algorithm for cash management. In ZFS, the ARC 222 comprises a self-tuning cash that can adjust based on the I/O workload. Additionally, the ARC 222 defines a data virtual address (DVA) that is used by the DMU 218. In some embodiments, the ARC 222 has the ability to evict memory buffers from the cache as a result of memory pressure to maintain a high throughput.

The SPA may also include an I/O pipeline 224, or "I/O manager," that translates the DVAs from the ARC 222 into logical locations in each of the virtual devices (VDEVs) 226 described below. The I/O pipeline 224 drives the dynamic striping, compression, checksum capabilities, and data redundancy across the active VDEVs. Although not shown explicitly in FIG. 2, the I/O pipeline 224 may comprise other modules that may be used by the SPA to read data from and/or write data to the storage pool. For example, the I/O pipeline 224 may include, without limitation, a compression module, an encryption module, a checksum module, and a metaslab allocator. The compression module may compress larger logical blocks into smaller segments, where a segment is a region of physical disk space. The encryption module may provide various data encryption algorithms that may be used to prevent unauthorized access. The checksum module can calculate a checksum for data and metadata within the storage pool hierarchy as described in more detail below. The checksum may be used, for example, to ensure data has not been corrupted. In some embodiments, the SPA may use the metaslab allocator to manage the allocation of storage space in the storage pool.

In ZFS, the storage pools may be made up of a collection of VDEVs. There are two types of virtual devices: physical virtual devices called leaf VDEVs, and logical virtual devices called interior VDEVs. A physical VDEV comprises a writeable media block device, such as a hard disk or Flash drive. A logical VDEV is a conceptual grouping of physical VDEVs. VDEVs can be arranged in a tree with physical VDEVs existing as leaves of the tree. The storage pool may have a special logical VDEV called a "root VDEV" which roots the tree. All direct children of the root VDEV (physical or logical) are called "top-level" VDEVs. In general, VDEVs implement data replication, mirroring, and architectures such as RAID-Z and RAID-Z2. Each leaf VDEV represents one or more physical storage devices 228 that actually store the data provided by the file system.

In some embodiments, the file system comprises an object-based file system where both data and metadata are stored as objects. More specifically, the file system may include functionality to store both data and corresponding metadata in the storage pool. A request to perform a particular operation (i.e., a transaction) is forwarded from the operating system, via the system call interface 208, to the DMU 218, which translates the request to perform an operation on an object directly to a request to perform a read or write operation (i.e., an I/O request) at a physical location within the storage pool. The SPA receives the request from the DMU 218 and writes the blocks into the storage pool using a COW procedure. COW transactions may be performed for a data write request to a file. Instead of overwriting existing blocks on a write operation, write requests cause new segments to be allocated for the modified data. Thus, retrieved data blocks and corresponding metadata are never overwritten until a modified version of the data block and metadata are committed. Thus, the DMU 218 writes all the modified data blocks to unused segments within the storage pool and subsequently writes corresponding block pointers to unused segments within the storage pool. To complete a COW transaction, the SPA issues an I/O request to reference the modified data block.

FIGS. 3A-3B illustrate a COW process for a file system, according to some embodiments. For example, the ZFS system described above uses a COW transactional model where all block pointers within the file system may contain 256-bit checksum of a target block which is verified when the block is read. As described above, blocks containing active data are not overwritten in place. Instead the new block is allocated, modified data is written to it, and then any metadata blocks referencing it are simply read, reallocated, and rewritten. When new data is written, the blocks containing the old data may be retained, allowing a snapshot version of the file system to be maintained. Snapshots may be created quickly, since all the data in the snapshot is already stored. Snapshots are also very space efficient, since any unchanged data is shared among the file system and its snapshots.

FIG. 3A illustrates a simplified snapshot of a file system, according to some embodiments. A root block 302 may represent the root of the file system, or "uberblock." The file system can be traversed through files and directories by navigating through each child node 304, 306 of the root 302. Each non-leaf node represents a directory or file, such as nodes 308, 310, 312, and 314. Each leaf node 316, 318, 320, 322 represents a data block of a file.

FIG. 3B illustrates a snapshot of the file system after an initial stage of a write operation. In this example, the data blocks represented by nodes 324 and 326 have been written by the file system. Instead of overwriting the data in nodes 316 and 318, new data blocks are allocated for nodes 324 and 326. Thus, after this operation, the old data in nodes 316 and 318 persist in the memory along with the new data in nodes 324 and 326.

FIG. 3C illustrates a snapshot of the file system as the write operation continues. In order to reference the newly written data blocks in nodes 324 and 326, the file system determines nodes 308 and 310 that reference the old nodes 316 and 318. New nodes 328 and 330 are allocated to reference the new data blocks in nodes 324 326. The same process is repeated recursively upwards through the file system hierarchy until each node referencing a changed node is reallocated to point to the new nodes.

When the pointer blocks are allocated in new nodes in the hierarchy, the address pointer in each node is updated to point to the new location of the allocated child in memory. Additionally, each data block includes a checksum that is calculated by the data block referenced by the address pointer. For example, the checksum in node 328 is calculated using the data block in node 324. This arrangement means that the checksum is stored separately from the data block from which it is calculated. This prevents so-called "ghost writes" were new data are never written, but a checksum stored with the data block would indicate that the block was correct. The integrity of the file system can be quickly checked by traversing the file system and calculating checksums at each level based on child nodes.

In order to finalize the write operation, the root 302 can be reallocated and updated. FIG. 3B illustrates a snapshot of the file system at the conclusion of the write operation. When the root 302 is ready to be updated, a new uberblock root 336 can be allocated and initialized to point to the newly allocated child nodes 332 and 334. The root 336 can then be made the root of the file system in an atomic operation to finalize the state of the file system.

The embodiments described herein may be implemented in the system described above in FIGS. 1-3. For example, the system may comprise one or more processors of the various servers, storage appliances, and/or switching circuits of FIG. 1. Instructions may be stored in one or more memory devices of the system that cause the one or more processors to perform various operations that affect the functioning of the file system. Steps of various methods may be performed by the processors, memory devices, interfaces, and/or circuitry of the system in FIGS. 1-2.

The embodiments described herein are tailored to quickly resilver failed disks as quickly and efficiently as possible. The file system may use various methods for identifying a failed disk and discovering blocks for resilvering. For example, a dirty time log may be maintained by the SPA for the storage pool with each entry identifying a failed transaction. The entry can identify when the failed disk was offline and which I/O requests were not successfully completed as described above. In some embodiments, when a block is written, it may have a birth time associated with it in the form of a transaction group number. The SPA can track which blocks need to be resilvered in response to a failure of one of the storage devices 228 using a range of the transaction group numbers.

Figure 4:
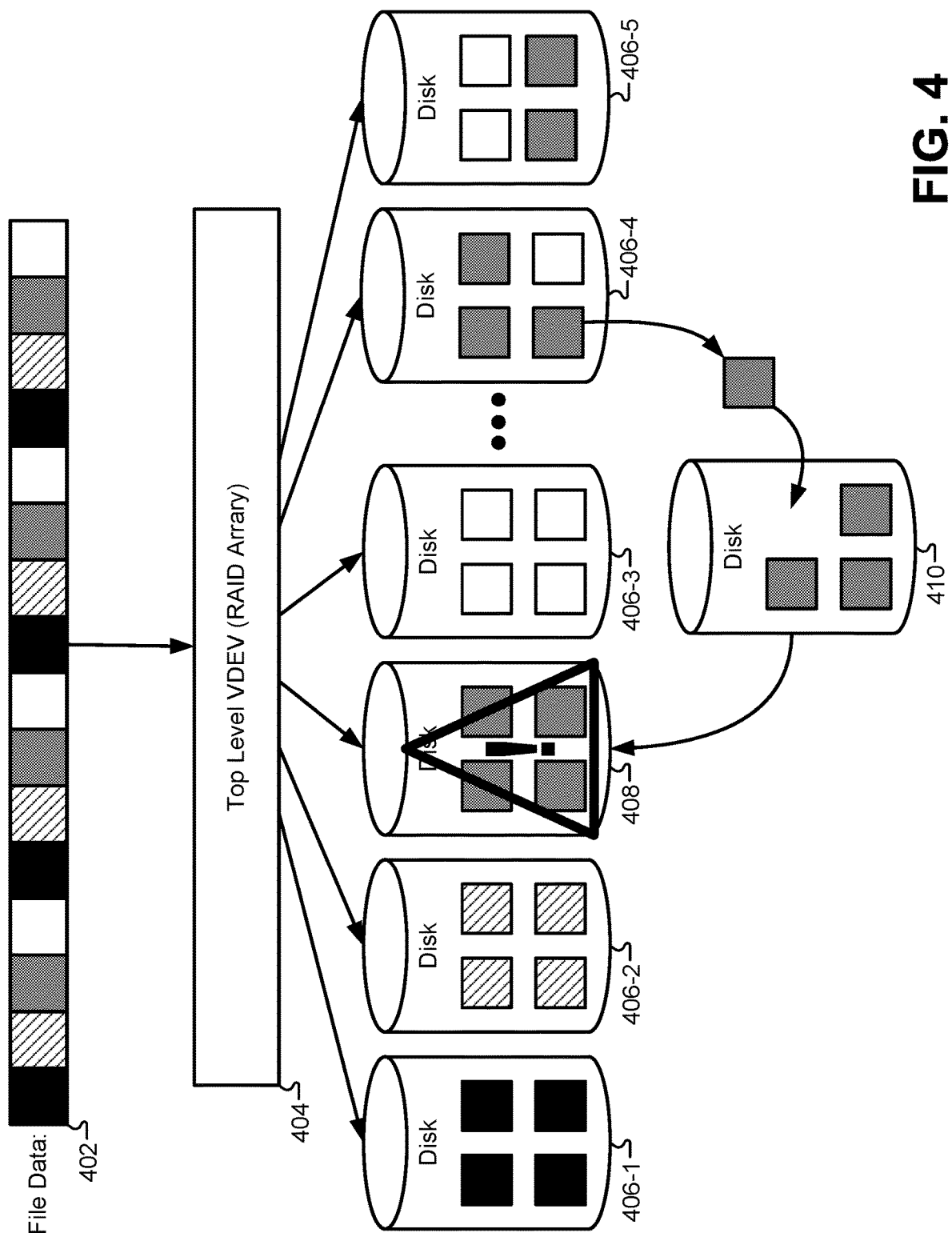
FIG. 4 illustrates how data can be striped and stored in an array of storage devices, according to some embodiments.

FIG. 4 illustrates how data can be striped and stored in an array of storage devices, according to some embodiments. Data striping is the technique of segmenting logically sequential data, such as a file 402, so that consecutive segments are stored in different storage devices 406. Striping allows read/write operations to be executed more efficiently because they can be done in parallel. As illustrated in FIG. 4, the file 402 can be segmented into four different groups and sent to different ones of the plurality of storage devices 228. For example, the $1^{st}$, $5^{th}$, $9^{th}$, . . . segments are sent to device 406-1; the $2^{nd}$, $6^{th}$, $10^{th}$, . . . segments are sent to device 406-2, and so forth. In addition to data striping, all of the storage devices 406, 408 organized under a top-level VDEV 404 can form a redundant array of inexpensive disks (RAID) to combine the storage devices 406, 408 into a single logical unit. Data can be distributed across the devices to balance reliability, availability, performance, and/or capacity is required by the particular application. In the RAID array, disk mirroring can be used to replicate data stored on the storage devices 406, 408 to ensure continuous availability. Mirroring is used to replicate data that is lost during a device failure.

When one of the storage devices 408 in the storage pool fails, the file system can activate a spare device 410. The data on the failed device 408 can then be reconstructed on the spare device 410. The file system can discover blocks referenced in the file system corresponding to data stored on the failed device 408. Copies of the data blocks that were stored on the failed device 408 can be identified in mirror locations in the storage pool. For example, blocks of data stored on the failed device 408 can also be found on storage device 406-4 and/or 406-5. In some embodiments, mirrored devices may be complete copies of other devices in the array. In other embodiments, mirrored devices need not be complete copies while at least one copy of each block is maintained in the array.

As described above, traditional resilvering would discover data blocks on the failed device 408 by traversing the file system. As these data blocks were found, copies could then be located in the device array and copied to the spare device 410. However, because this process was carried out in the order in which blocks were written, i.e., the order in which they appeared in the file system hierarchy, they were not written sequentially to the replacement device 410. Nonsequential data writes resulted in a large number of I/O operations to the spare device 410. Because I/O operations to a memory device are the predominant factor in the time required to resilver a device, frequent I/O operations caused the resilver process to be very slow and inefficient.

Figure 5:
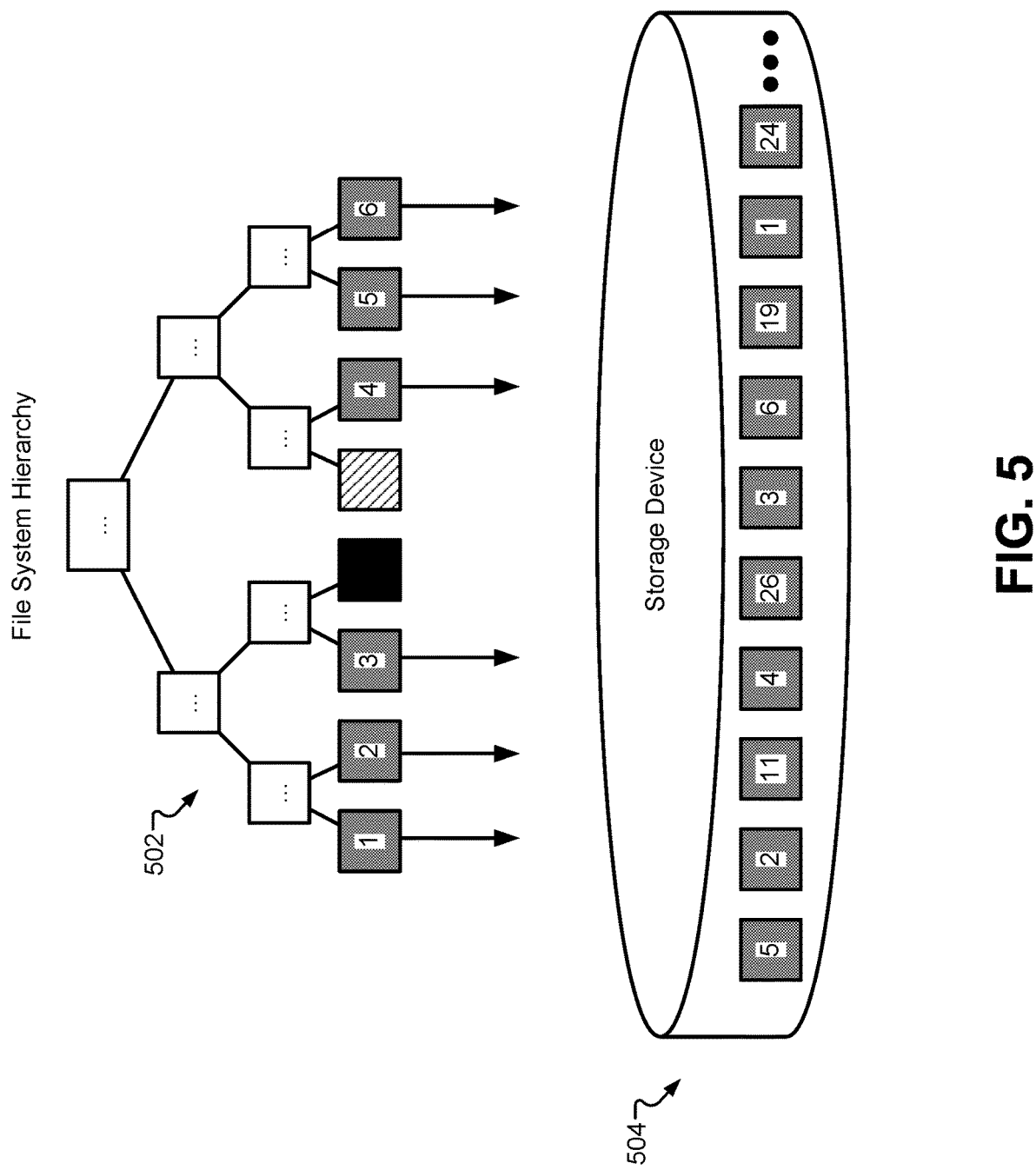
FIG. 5 illustrates an ordering in the file system hierarchy compared to a physical ordering on the storage device, according to some embodiments.

FIG. 5 illustrates an ordering in the file system hierarchy 502 compared to a physical ordering on the storage device, according to some embodiments. Data blocks in the file system hierarchy 502 are generally ordered according to when they were written. Thus, data blocks 1, 2, 3 in the file system hierarchy 502 would be read first, followed by data blocks 4, 5, 6 when the file system is traversed. One having ordinary skill in the art would readily understand that the file system hierarchy 502 of FIG. 5 is greatly simplified for the sake of clarity, while real file system hierarchies will be much larger and more complex.

Each node in the file system hierarchy 502 would be written to one of the storage devices in the storage array. FIG. 5 illustrates a single storage device 504 that stores at least some of the blocks from the file system hierarchy 502. As described above, consecutive data locations in a file may be striped two different devices in the storage array. Note that while data blocks 1, 2, 3 occur first and in order in the file system hierarchy 502, they are not consecutive, ordered, or first in the actual physical locations in storage device 504. Therefore, reading data blocks 1, 2, 3 from mirrored locations when the storage device 504 fails would result in piecemeal I/O operations to write to different locations in a replacement for the storage device 504. It will be understood that both the data blocks and metadata in the file system hierarchy 502 would be written to storage devices such as storage device 504, and that these have been omitted from FIG. 5 for clarity.

Figure 6:
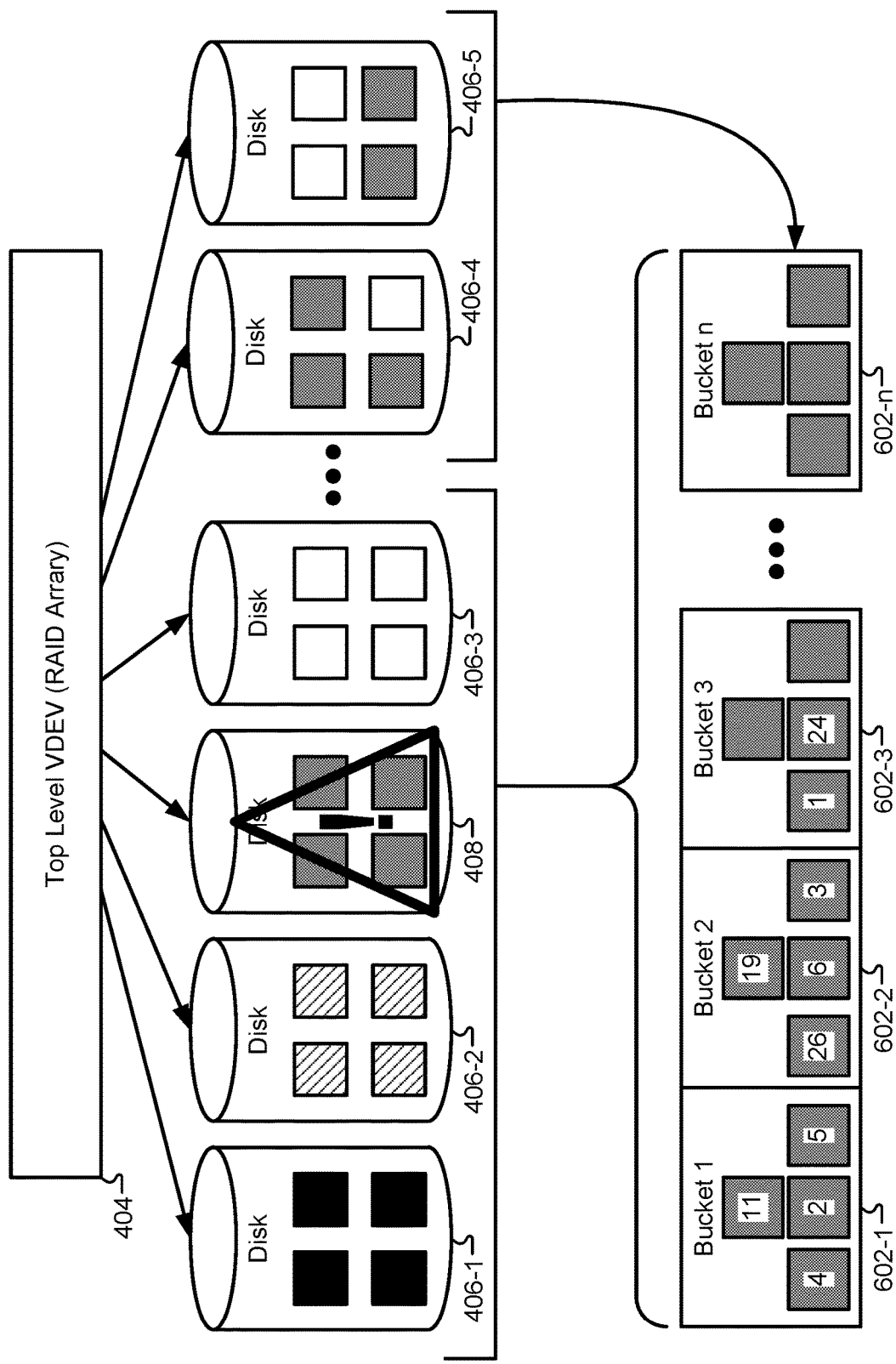
FIG. 6 illustrates a first phase in an efficient resilver operation, according to some embodiments.

FIG. 6 illustrates a first phase in an efficient resilver operation, according to some embodiments. In order to accelerate the resilver operation, the embodiments described herein can first order the data blocks found on the failed device 408 in the order in which they appear on the failed device 408 instead of the order in which they are written to the file system hierarchy. When the failed device 408 is detected in the storage pool, the file system can activate the spare device 410 on which the data on the failed device 108 can be reconstructed. Next, the file system can discover blocks stored in the file system that are located on the failed device 408 by traversing the file system. Each block in the file system hierarchy will have a block number that identifies the block uniquely to the file system. Additionally, each block will have a DVA that identifies a location in the storage pool where the block can be addressed. The file system can use the DVA to identify a particular storage device on which each particular block in the file system is stored. By traversing the entire file system, every block residing on the failed device 408 can be identified.

Next, the file system can create an array of temporary objects, or "buckets" 602 on the remaining unfailed devices in the storage pool. The number of buckets 602 in the array may be based on the amount of memory in the failed device 408. For example, for a 200 GB disk, 200 buckets may be created, with each bucket being 1 GB in size. Any block that falls within the first 1 GB of the failed device 408 may be sorted into the first bucket 602-1; any block that falls within the second 1 GB of the failed device 408 may be sorted into the second bucket 602-2; and so on until the entire contents of the 200 GB failed device 408 are sorted into the buckets 602. For each block that is on the failed device 408, the DVA describing the block location can be appended to the block such that each block in the array of buckets 602 includes the actual data from the failed storage device 408 or a reference to the actual data, as well as the location on the failed storage device 408. To illustrate, the first bucket 602-1 includes blocks 11, 4, 2, and 5 corresponding to blocks in the first section of the storage device 504 of FIG. 5. Similarly, the second bucket 602-2 includes blocks 19, 26, 6, and 3 from the second section of the storage device 504 of FIG. 5. In other embodiments, the number of buckets 602 in the array may be based on a percentage of memory found on the failed device 408. For example, a 300 GB disk may be divided into five 60 GB buckets. The file system may sort the blocks from the failed device 408 into the buckets 602 based on the physical location of the blocks on the disk using the DVA 312. For example, any block with a DVA offset of 0x0-0xefffffff may be sorted into the first bucket 602-1; any block with a DVA offset of 0xf00000000-0x1e00000000 may be sorted into the second bucket 602-2, and so forth.

Note that this initial sorting procedure that places blocks into buckets 602 is very coarse. Each of the buckets 602 includes blocks in a particular address range; however, the blocks within each bucket need not be initially sorted. Due to limited memory, some embodiments do not sort all data at once. Instead, as can be understood from FIG. 6, the file system first performs the coarse-grained sorting of the blocks based on the DVA of the blocks. In some embodiments, each of the buckets 602 may comprise a temporary object to which blocks are appended during the traverse. This temporary object can be stored persistently on one or more of the storage devices, and therefore does not need to be held in memory.

Figure 7:
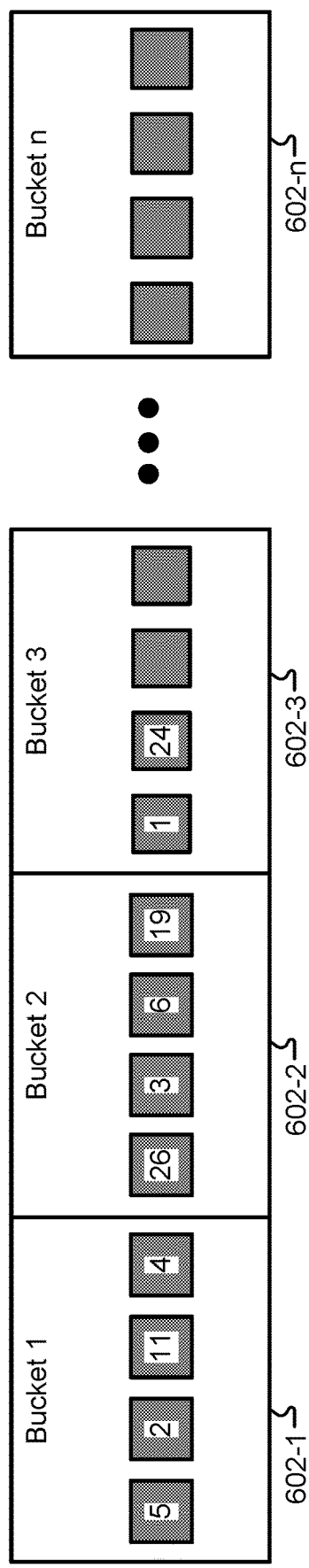
FIG. 7 illustrates a second phase in the efficient resilver process where the contents of each bucket are sorted, according to some embodiments.

FIG. 7 illustrates a second phase in the efficient resilver process where the contents of each bucket are sorted, according to some embodiments. After coarsely sorting the blocks of the failed device into the buckets 602, the file system may perform a fine-grained sorting of each block. In some embodiments, the file system may sort the blocks in the first bucket 602-1 into a sorted tree by block location disk offset. For example, during fine grained sorting, the first bucket 602-1 having blocks with the DVA offset of 0x0-0xefffffff may be sorted in order based on the DVAs into a tree structure. The sorted tree may be an AVL tree in some embodiments, as this particular data structure is readily available in the ZFS file system. However, any other data structure and/or sorting algorithm may be used. The file system can then sequentially resilver the blocks in the first bucket 602-1 based on the sorted tree in the bucket 602-1. Once all the blocks in the bucket 602-1 are resilvered, the file system can delete the bucket 602-1 and proceed to sort the blocks in the next bucket 602-2 in the array. For example, the second bucket having a DVA offset of 0xf00000000-0x1e00000000 can be fine-grain sorted and sequentially resilvered after the bucket 602-1. The file system can repeat this procedure until all the buckets 602 in the array are sorted, resilvered, and deleted. Deleting the buckets after each sequential resilver can free memory in the rest of the disk array as soon as possible. Additionally, by first coarsely sorting the blocks from the failed device into the buckets 602, the sorting process for each individual bucket can be performed much more efficiently than sorting the contents of all the buckets together.

Figure 8:
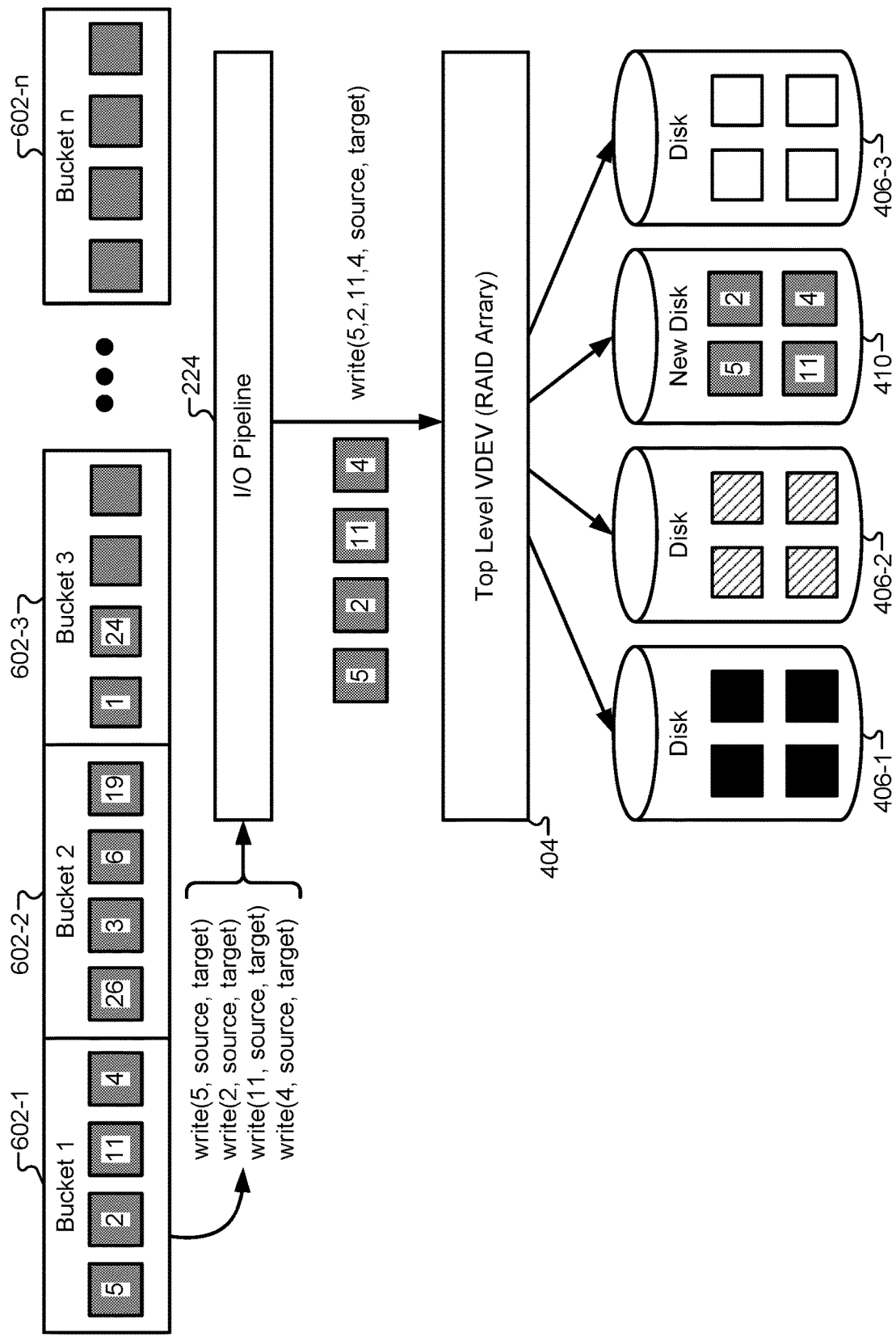
FIG. 8 illustrates how a sorted bucket can be resilvered using sequential I/O operations, according to some embodiments.

FIG. 8 illustrates how a sorted bucket can be resilvered using sequential I/O operations, according to some embodiments. Beginning with bucket 602-1, a series of write commands can be generated to transfer data from a source device to a target device. In many cases, the source device and the target device will be the same, particularly in disk arrays with mirroring. The I/O pipeline 224 described in FIG. 2 can receive a series of individual write commands that would normally be executed individually on the disk array, and instead translate those individual commands into a sequential write command. This allows groups of memory blocks to be transferred from the source device to the target device. Sequential data transfers are much more efficient than performing the same data transfer using individual transfer commands. The sequential commands are only possible because the contents of bucket 602-1 have been sorted into order based on disk offset, or location on the failed device before being sent to the I/O pipeline 224.

Figure 9:
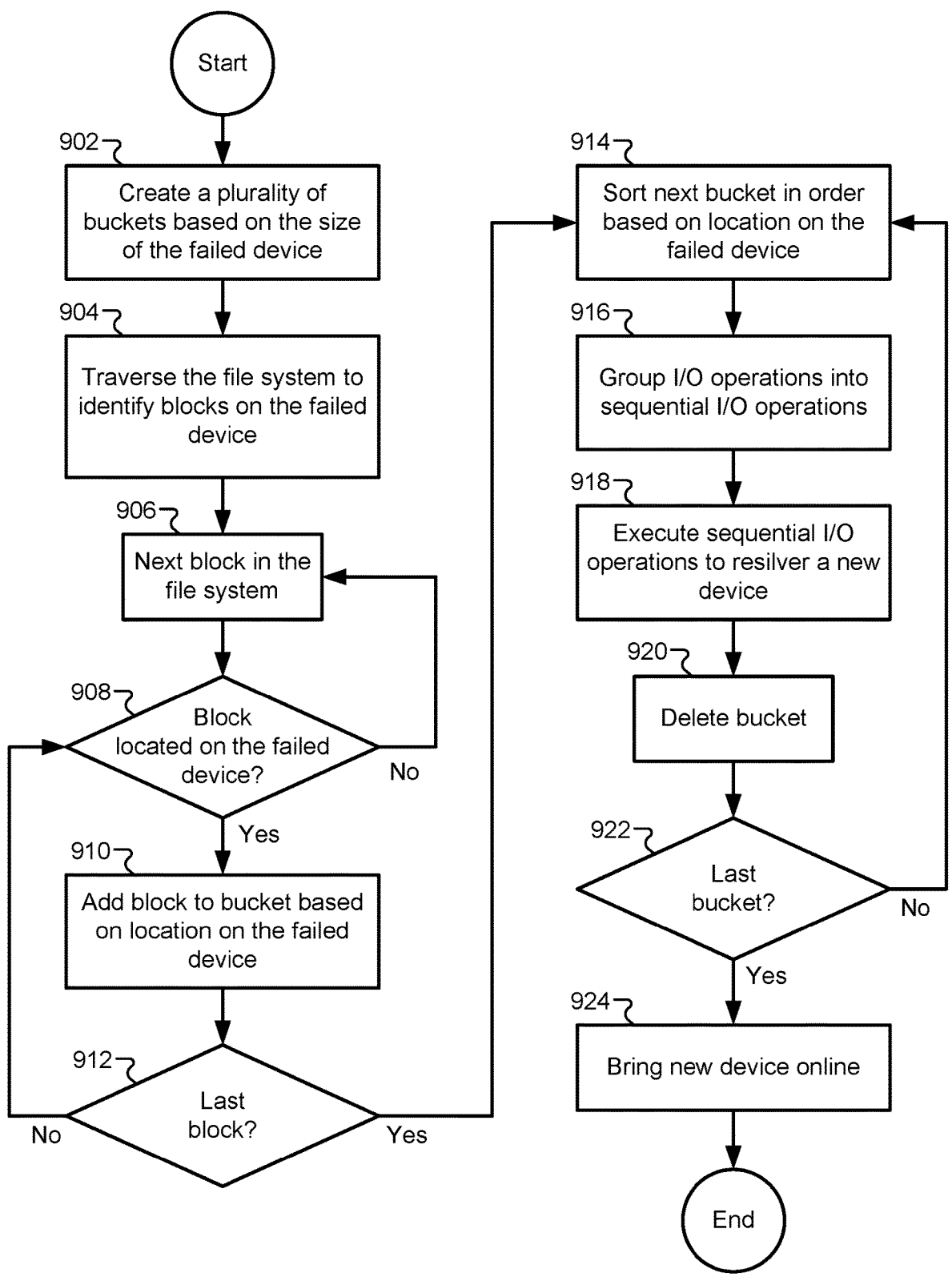
FIG. 9 illustrates a flowchart of a method for efficiently resilvering a failed device, according to some embodiments.

FIG. 9 illustrates a flowchart of a method for efficiently resilvering a failed device, according to some embodiments. The method may include creating a plurality of buckets based on the size of the failed device (902). In some embodiments, the number of buckets may be statically determined while the size of each bucket is based on the size of the failed device. In other embodiments, the size of each bucket may be statically determined while the number of buckets is based on the size of the failed device. The method may also include traversing the file system to identify blocks on the failed device (904). Each leaf node in the file system can be examined by traversing the file tree, and the physical disk address of each block can be read to determine whether the block resides on the failed device. The method may additionally include a loop that moves to the next block in the file system (906) by traversing the file tree, determining whether the block is located on the failed device (908), adding the block to one of the buckets if it is located on the failed device (910), and repeating this procedure until the last block of the file system has been traversed (912). By adding blocks to appropriate buckets, this loop performs a coarse sorting function on the contents of the failed device.

A second loop can be performed that successively sorts each bucket according to the physical disk location of each block (914). This may fine-grained sorting procedure may be performed using the DVA offset of each block such that the final sorted data structure in each bucket is sorted in the order in which the blocks physically appear on the failed device. For each bucket, a set of individual I/O transactions may be generated from source devices to a new target device, and the individual I/O transactions may be grouped together into one or more sequential I/O operations (916). Each sequential I/O operation can be executed to copy data from the source devices to the new target device (918), thus "resilvering" the new target device to replace the failed device. Some embodiments may then delete a bucket that has been resilvered (920), while other buckets may maintain the contents of the bucket to resilver additional failed devices as will be described in greater detail below. After the last bucket has been used in the resilvering procedure (922), the new device may be brought online (924).

It should be appreciated that the specific steps illustrated in FIG. 9 provide particular methods of efficiently resilvering a device according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the data (or metadata) can be stored in the storage pool using a RAID scheme similar to that illustrated in FIG. 4. If the data (or metadata) is stored using a RAID scheme, then resilvering the failed device 408 may include first reconstructing the data (or metadata) in accordance with the RAID scheme and then issuing resilvering I/O commands to write the reconstructed data (or metadata) to the new device 410 in the storage pool. RAID stripes can withstand a certain number of failures of the storage devices 406 before the data becomes unrecoverable. For example, double parity protection schemes, such as triple mirroring, can handle failures of two of the storage devices 406. Double parity protection schemes are beneficial as a storage capacity of the storage pool increases. However, the increased storage capacity of the storage devices 406 results in longer rebuild times following a failure of the failed storage device 408, which renders the data vulnerable to a failure of a second storage device during this increased window. Double parity protection schemes should account for this vulnerability.

Figure 10:
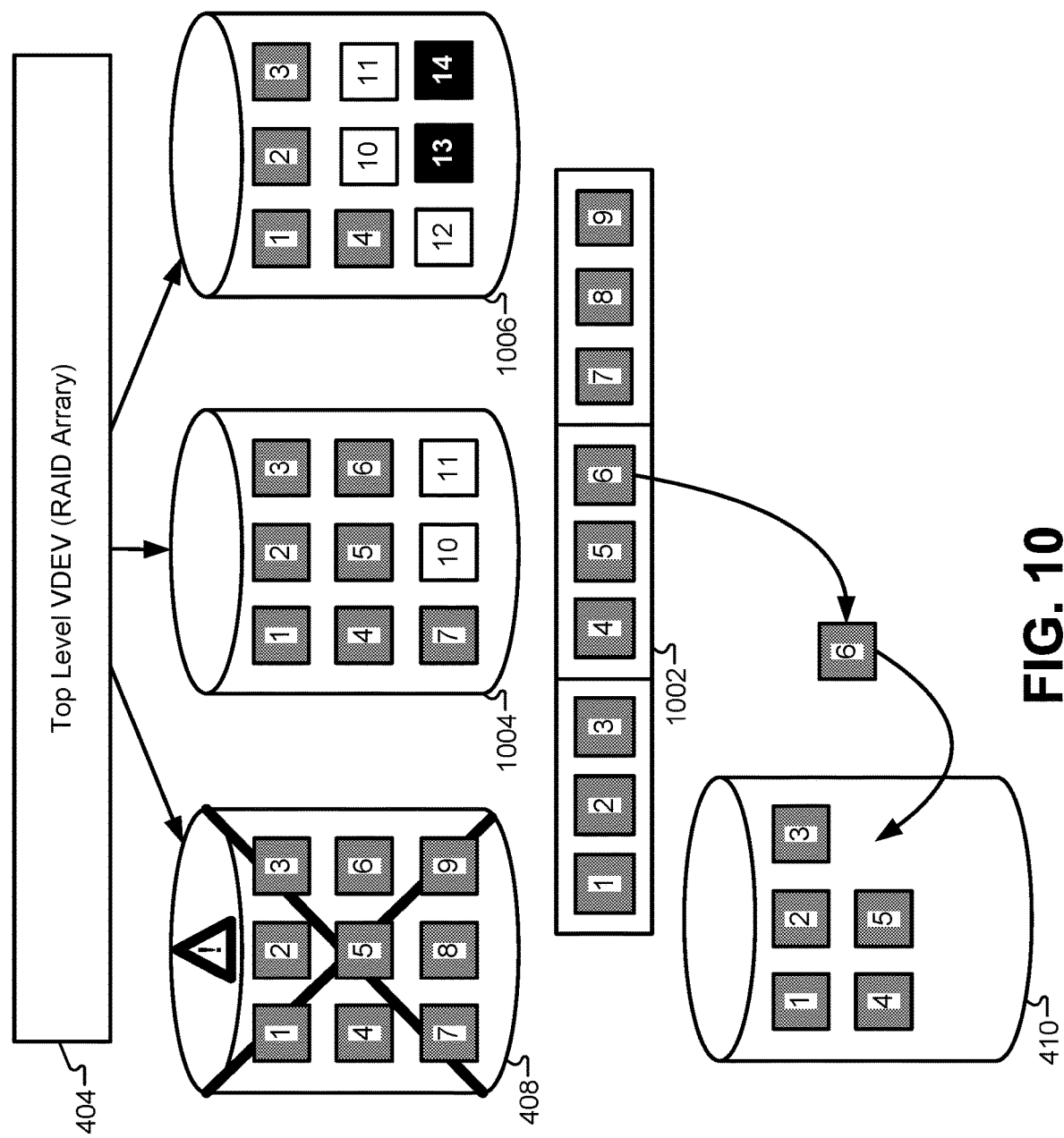
FIG. 10 illustrates a diagram of an array of storage devices where more than one device can fail at a time, according to some embodiments.

FIG. 10 illustrates a diagram of an array of storage devices where more than one device can fail at a time, according to some embodiments. As described above, the data corresponding to the failed storage device 408 can be reconstructed in two phases. During the first phase, the file system can generate a plurality of buckets 1002 to keep a list of the DVAs of the blocks to be reconstructed. Each of the buckets has a range of the DVAs. The file system traverses the storage pool and writes the DVAs into the corresponding buckets 1002 based on the range of the DVAs assigned to the buckets. During the second phase, the file system can read the DVAs within one of the buckets 1002, sort the DVAs in memory, and write the data to the new storage device 410 sequentially.

Figure 11:
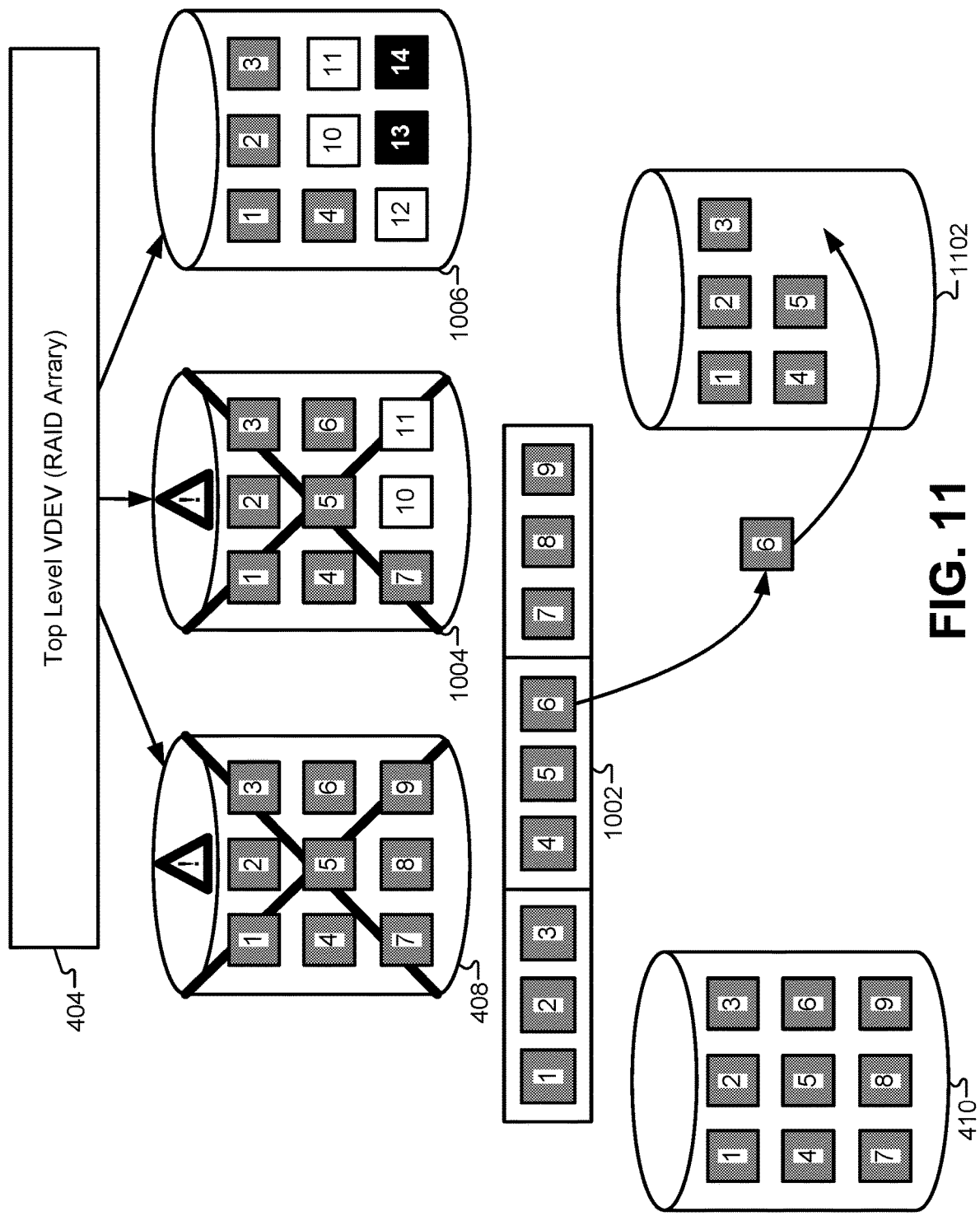
FIG. 11 illustrates a diagram of a RAID storage devices with two failures, according to some embodiments.

In a storage pool that uses double-mirroring or higher, memory blocks on the failed device 408 may also reside on more than one additional storage device in the storage pool. For example, in FIG. 10, it can be assumed that memory blocks 1-9 from the failed storage device 408 reside on at least one additional device in the storage pool (not shown). Additionally, blocks 1-7 also reside in a third location, namely on storage device 1004. FIG. 11 illustrates a diagram of a RAID storage devices with two failures, according to some embodiments. In some cases, when the second device 1004 fails, the file system can restart the reconstruction process at the beginning, which may significantly increase the time for resilvering. This may be the case where there is no redundancy with the failed storage device 408 and the second failed storage device 1004.

However, where the failed storage device 408 and the second failed storage device 1004 are under the same top-level 404, the time to rebuild the second failed storage device 1004 may be eliminated or reduced. Because the file system traverses the storage pool and tracks the associated DVAs for the failed storage device 408, if the second failed storage device 1004 is in the same RAID stripe as the failed storage device 408, the file system can reduce the resilvering time by reusing at least part of the previously written information in the buckets 1002, rather than retraversing the data in the storage pool through the file system from scratch. The file system can resume the resilvering process by reusing the ordering and location information from the reconstructing process of the failed storage device 408 to also reconstruct the second failed storage device 1004.

If the second failed storage device 1004 failed during the first phase of the efficient resilvering process where data blocks are sorted into buckets, the file system may resume this first phase at the last DVA in the DVA list that was written into a bucket. If the second failed storage device 1004 failed during the second phase of the efficient resilvering process where individual buckets are sorted by DVA and translated into sequential I/O commands, the file system may resume the resilvering process at the end of the first phase with each of the DVAs in the DVA list written into corresponding buckets. As such, independent of where in the resilvering process the file system was at the time of the failure of the second failed storage device 1004, the file system can leverage the work completed during the first phase for the failed storage device 408. By resuming the reconstruction of the data utilizing the ordering and/or location information from the first phase, the time to rebuild the second failed storage device 1004 may be eliminated or reduced by up to fifty percent, which in turn improves the data integrity of the storage pool and reduces the change of data loss.

Specifically, in the example of FIG. 11, the information from the first two buckets of the bucket array 1002 can be reused to re-silver the new storage device 1102. In some embodiments, the new storage device 1102 may be a complete mirror of the new storage device 410. In other embodiments, the new storage device 1102 may be only a partial mirror of the new storage device 410. For example, blocks 1-7 from failed storage device 408 are also located on the second failed storage device 1004. However, the second failed storage device 1004 also includes blocks 10-11 that are mirrored on other storage devices in the storage pool. Therefore, at least a portion of the ordering and/or location information in the array of buckets 1002 can be reused to resilver at least a portion of the new storage device 1102.

In some embodiments, reusing information from the resilvering process of the failed storage device 408 may require that both the failed storage device 408 and second failed storage device 1004 be under the same top-level 404. In FIG. 11, storage devices 408, 1004, and 1006 are under the same top-level 404 in the storage pool. Other storage devices (not shown) may be organized in the storage pool under a second top level (not shown). In some embodiments, information from the resilvering process for the failed storage device 408 may be reused following the failure of a second storage device under the same top-level 404 as the failed storage device 408, such as the second failed storage device 1004. However, if an additional storage device failed under another top level, the resilvering process may need to start over at the beginning of the first phase for the additional failed storage device because the additional failed storage device and the failed storage device 408 are organized under different top levels.

In some embodiments, where the failed storage device 408 fails followed by the second failed storage device 1004, the first phase of the resilvering process can be resumed with the data block in a range of transaction group numbers that was most recently sorted into one of the buckets when the failed storage device 408 failed. For example, if the failed storage device 408 fails at a transaction group number 100 and the second failed storage device 1004 fails at a transaction group number 120, the file system can log the transaction group range [1-100] for the failed storage device 408 and the transaction group range [1-120] for the second failed storage device 1002. Once the file system completes reconstruction of a transaction group range (e.g., corresponding to a bucket), that range can then be removed from the transaction group list detailing the data blocks for resilvering. Thus, after the resilvering is completed for the failed storage device 408, the range of transaction group numbers remaining for resilvering following the failure of the second failed storage device 1004 is [101-120]. Because the resilvering for the second failed storage device 1004 reuses [1-100] completed for the failed storage device 408, the total length of time for completing the resilvering can be significantly reduced.

As an example illustrating the reduced resilvering time, assume the time to reconstruct the failed storage device 408 following a failure is approximately eight hours, with half this time corresponding to the first phase of traversing the file system and assigning block DVAs to buckets, and the other half of the time corresponding to the second phase of sorting individual buckets and executing sequential I/O transactions. If the second failed storage device 1004 fails during the first phase, the time to reconstruct the failed storage device 408 and second failed storage device 1004 will still be approximately eight hours plus any additional time to reconstruct the I/O transaction group range [101-120] that were not associated with the failed storage device 408. This is because the file system can reuse the first phase by continuing to sort the blocks into buckets starting at the last one sorted prior to the failure of the second failed storage device 1004. If the second failed storage device 1004 fails in the second phase, the time to complete the reconstruction would be less than approximately twelve hours, with four hours for the first phase for both the failed storage device 408 and the second failed storage device 1004, four hours for the second phase, and the time to reconstruct any additional data. This is because the file system can reuse the information from the first phase by starting from the end of the first phase and resume by sorting the transaction group numbers sequentially within the bucket for the next bucket range. Accordingly, the file system can be configured to recover from a two-storage-device failure in a storage pool at an average time of approximately nine hours, with half recovered within approximately eight hours when the second failure occurs during the first phase and half recovered within approximately eight to twelve hours when the second failure occurs during the second phase.

Figure 12:
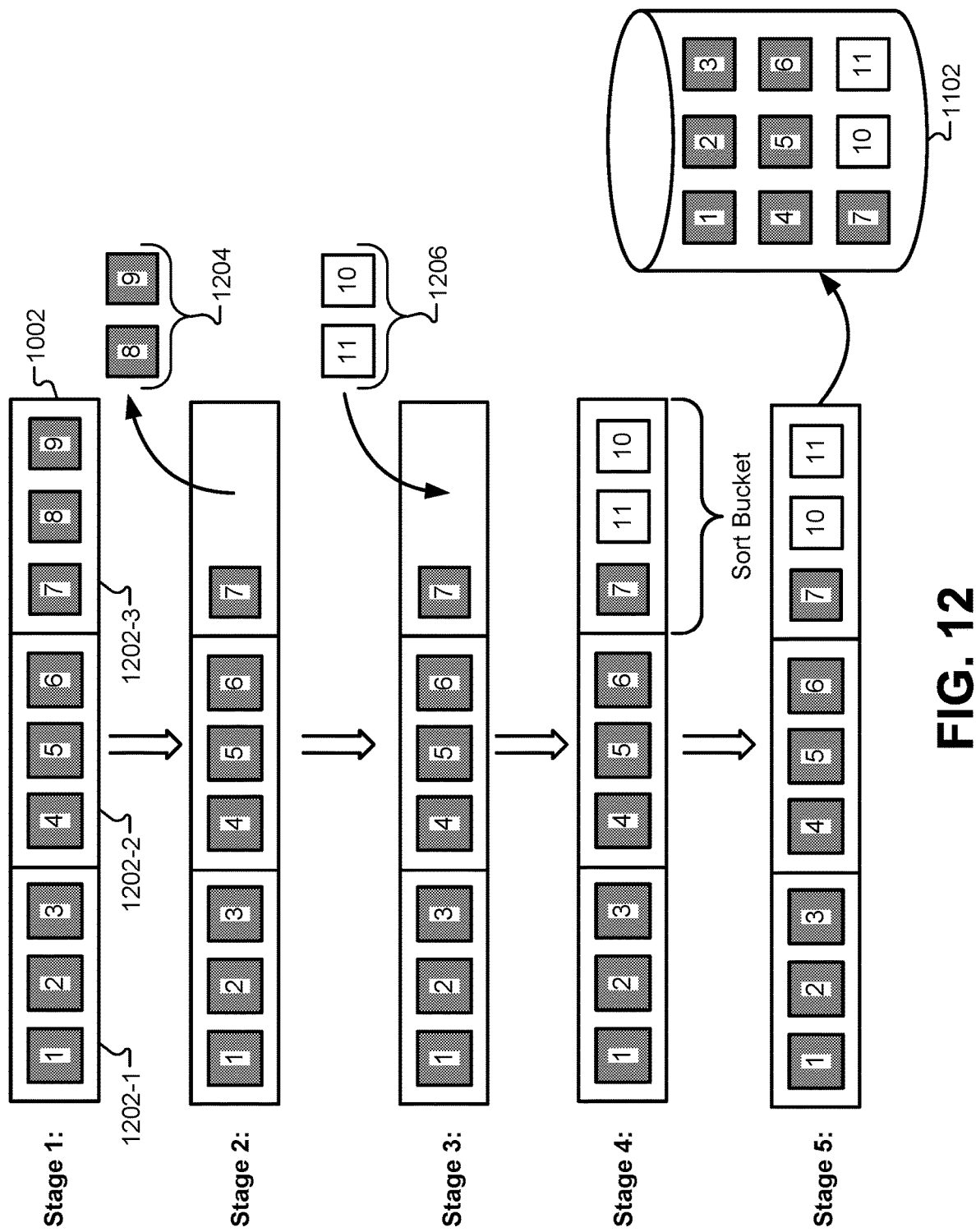
FIG. 12 illustrates an example of how information can be reused from the first phase of the resilvering process for a second failed storage device, according to some embodiments.

FIG. 12 illustrates an example of how information can be reused from the first phase of the resilvering process for a second failed storage device, according to some embodiments. At Stage 1, a set of buckets 1202 may be populated with block information from the first failed storage device. After the second failed storage device is detected, the buckets 1202 can be examined to determine which of the data can be reused to resilver the second failed storage device. As shown in FIG. 12, each of the buckets 1202 has been populated with data blocks and sorted by DVA from the first failed storage device.

At Stage 2, a determination can be made that the location/ordering information of the contents of bucket 1202-1 and bucket 1202-2 are correct for the second failed storage device. In other words, the blocks appearing in these buckets appear in the same order on both of the failed storage devices. Additionally, a determination can be made that the contents of bucket 1202-3 are not entirely correct for the second failed storage device. Specifically, block 8 and block 9 are not located on the second failed storage device, even though they were located on the first failed storage device. In some embodiments, these blocks 1204 can then be removed from bucket 1202-3. It will be understood that the contents of the buckets 1202 may include actual copies of the data blocks in some embodiments, pointers to data blocks in other embodiments, and/or source addresses in still other embodiments. Therefore, removing blocks 1204 that are no longer needed for the second failed storage device may include removing actual data, pointers, addresses, and/or any other indicator of data blocks that are to be resilvered on the second failed storage device. In other embodiments, the process need not remove any blocks from the buckets. Instead, a determination can be made at runtime whether the I/O transactions to reconstruct the data are needed or not. For example, if certain blocks are needed to reconstruct the first failed device but not to reconstruct the second failed device, these blocks need not be removed from the buckets. Instead, during the second stage to reconstruct the second failed device, the system can simply determine that the I/O transactions are not needed for the second device for these blocks, and these blocks would only be written to the first device, but not the second.

At Stage 3, a determination can be made if additional data 1206 blocks from the second failed storage device need to be added to one or more of the buckets 1202. Specifically, block 11 and block 10, which were not found on the first failed storage device, need to be added to bucket 1202-3 in order to complete the resilver process for the second failed storage device. These blocks can be located by traversing at least a subset of the file system to locate blocks that were stored on the second failed storage device. The additional blocks 1206 (or pointers/indicators referencing these blocks) can be inserted into bucket 1202-3.

At Stage 4, the contents of block 1202-3 can be sorted into the order based on the DVA on the second failed storage device. Although not shown explicitly in FIG. 12, other buckets 1202-1, 1202-2, may also need to be resorted. In other words, the contents of buckets may be the same for the first and second failed storage devices, but the ordering may be different within the buckets. This may not be a common situation, but this operation is within the scope of many embodiments. Finally, at Stage 5, the buckets 1202 can be used to resilver the second failed storage device 1102.

In some embodiments, when the first device fails, the process begins to construct the bucket 1202 in the first phase. The contents of the bucket 1202 can be based solely on the memory blocks needed to resilver the first failed device. If the second device fails during the first phase, the process continues adding DVAs to bucket 1202 based on the first failed device. During the second phase, the process then goes through bucket 1202 and writes data to both failed devices if applicable. When the resilver of the first failed device is finished, bucket 1202 can be deleted. Next, the process will start another resilver process and construct a new bucket. For the new bucket, since the first failed device is already resilvered, the contents of the new bucket would be based only on the remaining DVAs for the second device.

Figure 13:
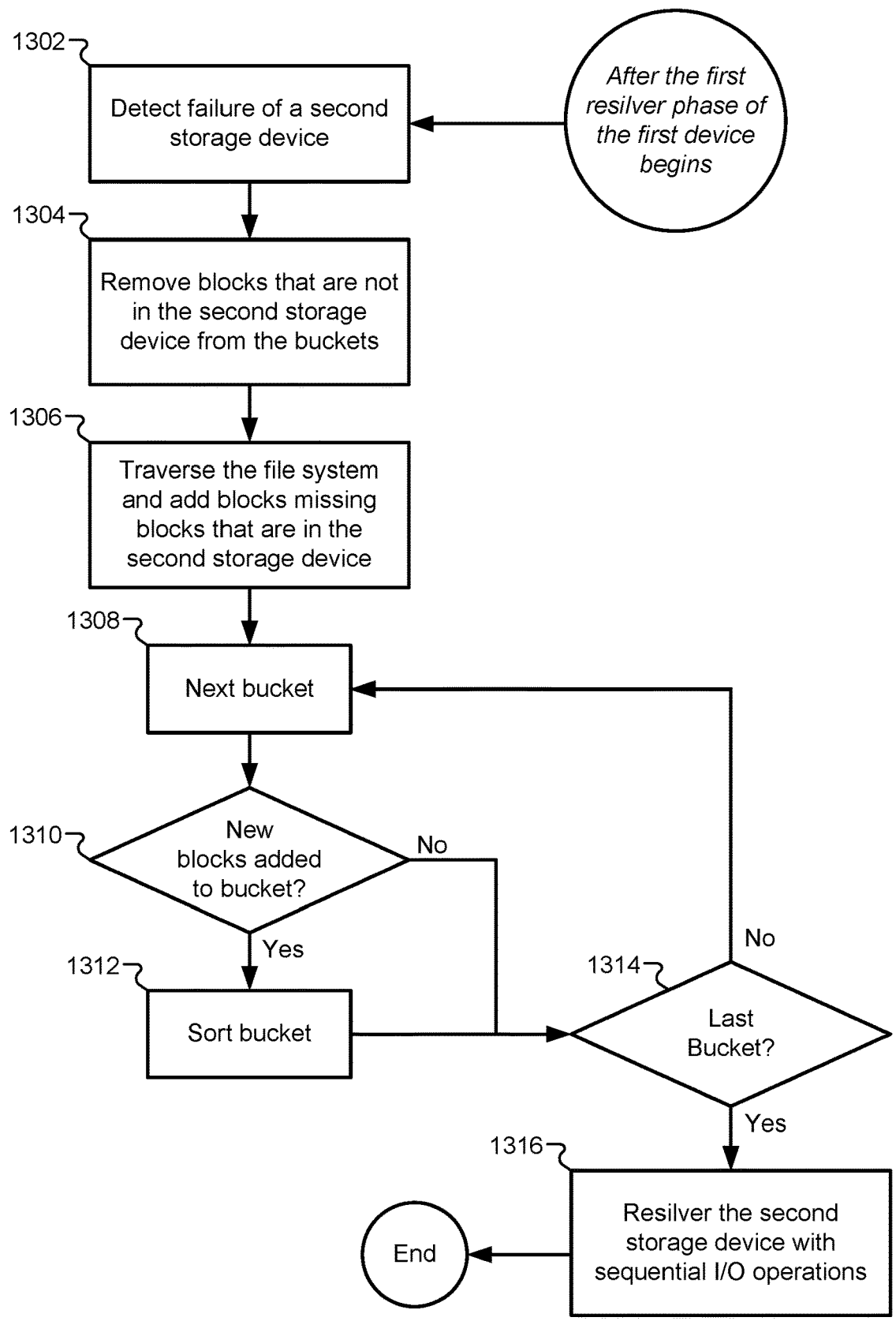
FIG. 13 illustrates a flowchart of a method for resilvering a plurality of failed storage devices in the storage pool, according to some embodiments.

FIG. 13 illustrates a flowchart of a method for resilvering a plurality of failed storage devices in the storage pool, according to some embodiments. The method may begin after detecting a failure of a first storage device in the storage pool. As described above, resilvering the first failed storage device may include determining or identifying a plurality of data blocks that are stored on the first storage device, and sorting the plurality of data blocks into one or more buckets in an order in which the plurality of data blocks are located on the first failed storage device. The method may include detecting a failure of a second storage device in the storage pool (1302). This failure may be detected during or after the resilvering process for the first failed storage device.

The method may also include determining that one or more of the plurality of data blocks are also located on the second storage device. In other words, a determination can be made that at least a portion of the ordering/location information used to resilver the first storage device can be reused to resilver the second storage device. Specifically, the method may include removing blocks that are not in the second storage device from the buckets allocated for resilvering the first storage device (1304). The method may also include adding data blocks that are missing from the buckets that are found on the second storage device that were not found in the first storage device (1306). This process can be repeated for each bucket (1308). In some embodiments, buckets can be deleted and/or added as necessary. For each bucket, a determination can be made whether new blocks need to be added to the bucket or old blocks need to be deleted (1310). Once the contents of a bucket have been completely updated to represent the contents of the second failed storage device, the bucket can be sorted (1312). When all the buckets have been updated (1314), the process can resilver the second storage device using the updated buckets (1316). Alternatively, after each bucket is sorted, the second device can be partially resilver using that bucket, and that bucket can be deleted before moving onto the next bucket.

In some embodiments, an operation may detect a failure of a first storage device in a storage pool. The file system may then discover a plurality of data blocks in response to the failure of the first storage device. The data blocks may each have a transaction group number and correspond to I/O requests not successfully completed for the first storage device. The operation may discover the data blocks using the transaction group numbers. The file system may generate a plurality of temporary objects. Each of the temporary objects may be stored in memory and corresponds to a data block range (e.g., an assigned range of the transaction group numbers). The file system may sort each of the data blocks into one of the temporary objects during a first phase. file system may sort the data blocks based on a comparison of a storage location of each of the data blocks to the data block ranges of the temporary objects. As a result, each of the temporary objects may have a subset of the data blocks associated therewith. The file system may perform a second phase, which sorts the subset of the data blocks within each of the temporary objects based on the storage locations of the data blocks. The temporary objects may each be deleted from the memory following the reconstruction of a corresponding subset of the data blocks, which may include sequentially traversing and writing each of the corresponding subset of the data blocks in a logical block order.

The file system may detect a failure of a second storage device in the storage pool. The file system may resume a reconstruction of the data blocks in response to the failure of the second storage device by utilizing the sorting of the first phase. The file system may utilize the sorting of the first phase by continuing to sort each of the data blocks into one of the temporary objects starting from a resuming block (e.g., the data block within the data block ranges last sorted when the failure of the second storage device occurred) corresponding to when the failure of the second storage device was detected. When the failure of the second storage device is detected, the operation completes for the first storage device in addition to any additional operations for data blocks for the second storage device. The file system may utilize the sorting of the first phase by restarting the operation when the failure of the second storage device is detected.

It should be appreciated that the specific steps illustrated in FIG. 13 provide particular methods of resilvering a second storage device according to various embodiments of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of reconstructing data from a failed storage device in a storage pool, the method comprising:
    identifying a plurality of data blocks that are stored on the failed storage device;
    locating the plurality of data blocks on one or more redundant storage devices;
    sorting and storing the plurality of data blocks from the one or more redundant storage devices into a plurality of temporary objects in a first order in which the plurality of data blocks are located on the failed storage device, wherein a second order in which the plurality of data blocks are stored on the one or more redundant storage devices is different from the first order of the plurality of data blocks after sorting, wherein each of the plurality of data blocks is associated with an I/O operation, and wherein sorting the plurality of data blocks comprises:
        sorting the plurality of data blocks into one or more buckets by performing a first sorting operation that coarsely sorts data blocks into each of the one or more buckets based on disk address, such that blocks within each of the one or more buckets are not required to be in disk address order; and
        performing a second sorting operation that sorts the blocks within each of the one or more buckets according to disk address order;
    grouping the I/O operations for the plurality of data blocks into sequential I/O operations based on the order in which the plurality of data blocks are located on the failed storage device; and
    executing the sequential I/O operations to resilver a new storage device replacing the failed storage device.

2. The method of claim 1, wherein the storage pool comprises a Redundant Array of Independent Disks (RAID).

3. The method of claim 1, wherein identifying the plurality of data blocks that are stored on the failed storage device comprises traversing a file system to discover a physical location of each leaf node.

4. The method of claim 1, wherein the blocks within each of the one or more buckets are sorted into Adelson-Velsky Landis (AVL) tree.

5. The method of claim 1, wherein a number of the one or more buckets is based on an amount of memory on the failed storage device.

6. A non-transitory, computer-readable medium comprising instructions that, when executed by one or more processors, cause the one or more processors to perform operations comprising:
    identifying a plurality of data blocks that are stored on a failed storage device in a storage pool;
    sorting the plurality of data blocks in an order in which the plurality of data blocks are located on the failed storage device, wherein each of the plurality of data blocks is associated with an I/O operation, and wherein sorting the plurality of data blocks comprises sorting the plurality of data blocks into a plurality of temporary objects;
    grouping the I/O operations for the plurality of data blocks into sequential I/O operations based on the order in which the plurality of data blocks are located on the failed storage device; and
    executing the sequential I/O operations to resilver a new storage device replacing the failed storage device.

7. The non-transitory computer-readable medium according to claim 6 wherein executing the sequential I/O operations to resilver a new storage device comprises:
    sequentially traversing the plurality of data blocks in logical block order to reconstruct data for which the I/O operations were not successfully completed for the failed storage device.

8. The non-transitory computer-readable medium according to claim 6, wherein executing the sequential I/O operations to resilver the new storage device comprises deleting each temporary object after the data blocks therein are resilvered before moving on to a subsequent temporary object.

9. The non-transitory computer-readable medium according to claim 6, wherein identifying the plurality of data blocks that are stored on the failed storage device comprises traversing a file system to discover a physical location of each leaf node.

10. The non-transitory computer-readable medium according to claim 6, wherein sorting the plurality of data blocks comprises sorting the plurality of data blocks into one or more buckets by performing a first sorting operation that coarsely sorts data blocks into each of the one or more buckets based on disk address, such that blocks within each of the one or more buckets are not required to be in disk address order.

11. The non-transitory computer-readable medium according to claim 10, wherein sorting the plurality of data blocks further comprises performing a second sorting operation that sorts the blocks within each of the one or more buckets according to disk address order.

12. A system comprising:
    one or more hardware processors; and
    one or more memory devices comprising instructions that, when executed by the one or more hardware processors, cause the one or more hardware processors to perform operations comprising:

identifying a plurality of data blocks that are stored on a failed storage device in a storage pool;

sorting the plurality of data blocks in an order in which the plurality of data blocks are located on the failed storage device, wherein each of the plurality of data blocks is associated with an I/O operation;

grouping the I/O operations for the plurality of data blocks into sequential I/O operations based on the order in which the plurality of data blocks are located on the failed storage device; and executing the sequential I/O operations to resilver a new storage device replacing the failed storage device, wherein executing the sequential I/O operations comprises sequentially traversing the plurality of data blocks in logical block order to reconstruct data for which the I/O operations were not successfully completed for the failed storage device.

13. The system of claim 12 wherein:

the storage pool comprises a Redundant Array of Independent Disks (RAID); and identifying a plurality of data blocks that are stored on the failed storage device comprises traversing a file system to discover a physical location of each leaf node.

14. The system of claim 12 wherein:

sorting the plurality of data blocks comprises performing a first sorting operation that coarsely sorts data blocks into each of one or more buckets based on disk address, such that blocks within each of the one or more buckets are not required to be in disk address order;

sorting the plurality of data blocks into one or more buckets comprises performing a second sorting operation that sorts the blocks within each of the one or more buckets according to disk address order; and the blocks within each of the one or more buckets are sorted into Adelson-Velsky Landis (AVL) tree.

15. The system of claim 12, wherein sorting the plurality of data blocks comprises sorting the plurality of data blocks into a plurality of temporary objects.

16. The system of claim 15, wherein executing the sequential I/O operations to resilver the new storage device comprises deleting each temporary object after the data blocks therein are resilvered before moving on to a subsequent temporary object.

* * * * *

UNITED STATES PATENT AND TRADEMARK OFFICE
CERTIFICATE OF CORRECTION

PATENT NO. : 10,671,501 B2  
APPLICATION NO. : 15/610140  
DATED : June 2, 2020  
INVENTOR(S) : Taylor et al.

Page 1 of 1

It is certified that error appears in the above-identified patent and that said Letters Patent is hereby corrected as shown below:

In the Drawings

On sheet 2 of 13, in FIG. 2, under Reference Numeral 226-1, Line 1, delete "Arrary)" and insert -- Array) --, therefor.

On sheet 2 of 13, in FIG. 2, under Reference Numeral 226-2, Line 1, delete "Arrary)" and insert -- Array) --, therefor.

On sheet 4 of 13, in FIG. 4, under Reference Numeral 404, Line 1, delete "Arrary)" and insert -- Array) --, therefor.

On sheet 6 of 13, in FIG. 6, under Reference Numeral 404, Line 1, delete "Arrary)" and insert -- Array) --, therefor.

On sheet 10 of 13, in FIG. 10, under Reference Numeral 404, Line 1, delete "Arrary)" and insert -- Array) --, therefor.

On sheet 11 of 13, in FIG. 11, under Reference Numeral 404, Line 1, delete "Arrary)" and insert -- Array) --, therefor.

In the Specification

In Column 1, Line 67, delete "consideable" and insert -- considerable --, therefor.

In Column 3, Line 54, delete "the a" and insert -- the --, therefor.

In Column 4, Line 41, delete "/unsychronized" and insert -- /unsynchronized --, therefor.

In Column 6, Line 46, delete "nonvolatile" and insert -- non-volatile --, therefor.

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*